United States Patent
Kirchhoff et al.

(10) Patent No.: US 10,017,588 B2
(45) Date of Patent: *Jul. 10, 2018

(54) PROCESS FOR THE PRODUCTION OF WATER AND SOLVENT-FREE HALOBUTYL RUBBERS

(71) Applicant: ARLANXEO Deutschland GmbH, Dormagen (CH)

(72) Inventors: Jorg Kirchhoff, Cologne (DE); Rolf Feller, Mettmann (DE); Hanns-Ingolf Paul, Leverkusen (DE); Udo Wiesner, Bornheim (DE); John Lovegrove, Sarnia (CA); Adam Gronowski, Sarnia (CA)

(73) Assignee: ARLANXEO Deutschland GmbH, Dormagen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/631,955

(22) Filed: Feb. 26, 2015

(65) Prior Publication Data

US 2015/0183894 A1 Jul. 2, 2015

Related U.S. Application Data

(63) Continuation of application No. 13/635,954, filed as application No. PCT/EP2011/054447 on Mar. 23, 2011, now abandoned.

(30) Foreign Application Priority Data

Mar. 24, 2010 (EP) .................................... 10003140
Mar. 25, 2010 (EP) .................................... 10157706

(51) Int. Cl.
| | | |
|---|---|---|
| *C08F 6/10* | (2006.01) | |
| *C08F 6/00* | (2006.01) | |
| *C08C 19/12* | (2006.01) | |
| *B29C 47/76* | (2006.01) | |

(52) U.S. Cl.
CPC ............... *C08F 6/10* (2013.01); *C08F 6/003* (2013.01); *C08F 6/008* (2013.01); *B29C 47/76* (2013.01); *B29C 47/767* (2013.01); *C08C 19/12* (2013.01)

(58) Field of Classification Search
CPC ........ C08L 23/283; C08F 6/003; B29C 47/76; B29C 47/767
See application file for complete search history.

(56) References Cited

U.S. PATENT DOCUMENTS

| | | | |
|---|---|---|---|
| 2,833,750 A * | 5/1958 | Vickers | ................... B29B 13/00 159/2.2 |
| 3,963,558 A | 6/1976 | Skidmore | |
| 5,021,509 A | 6/1991 | Keller et al. | |

(Continued)

FOREIGN PATENT DOCUMENTS

| | | | | |
|---|---|---|---|---|
| DE | WO 2010006983 A1 * | 1/2010 | ................ | C08F 8/20 |
| JP | 63147501 A * | 6/1988 | | |

OTHER PUBLICATIONS

Hagberg (Comparison of solution rubber finishing processes—parts I and II, Process Machinery, Rubber World, Mar. 2000, 8 pages).*

(Continued)

*Primary Examiner* — Brieann R Johnston

(57) ABSTRACT

The present invention relates to water and solvent-free halogenated butyl rubber products as well as a process for the production thereof.

20 Claims, 12 Drawing Sheets

(56) References Cited

U.S. PATENT DOCUMENTS

| | | | | |
|---|---|---|---|---|
| 5,306,452 A | * | 4/1994 | Todd | B29C 47/38 |
| | | | | 264/102 |
| 5,342,908 A | * | 8/1994 | Osman | C08F 210/12 |
| | | | | 526/135 |
| 5,670,582 A | * | 9/1997 | Chung | C08F 8/22 |
| | | | | 525/333.4 |
| 9,512,240 B2 | | 12/2016 | Kirchhoff et al. | |
| 2007/0203306 A1 | | 8/2007 | Resendes et al. | |

OTHER PUBLICATIONS

JPO Abstract of JP 63147501 (Jun. 1988, 1 page).*
Japanese Office Action dated Oct. 29, 2013, four pages.

* cited by examiner

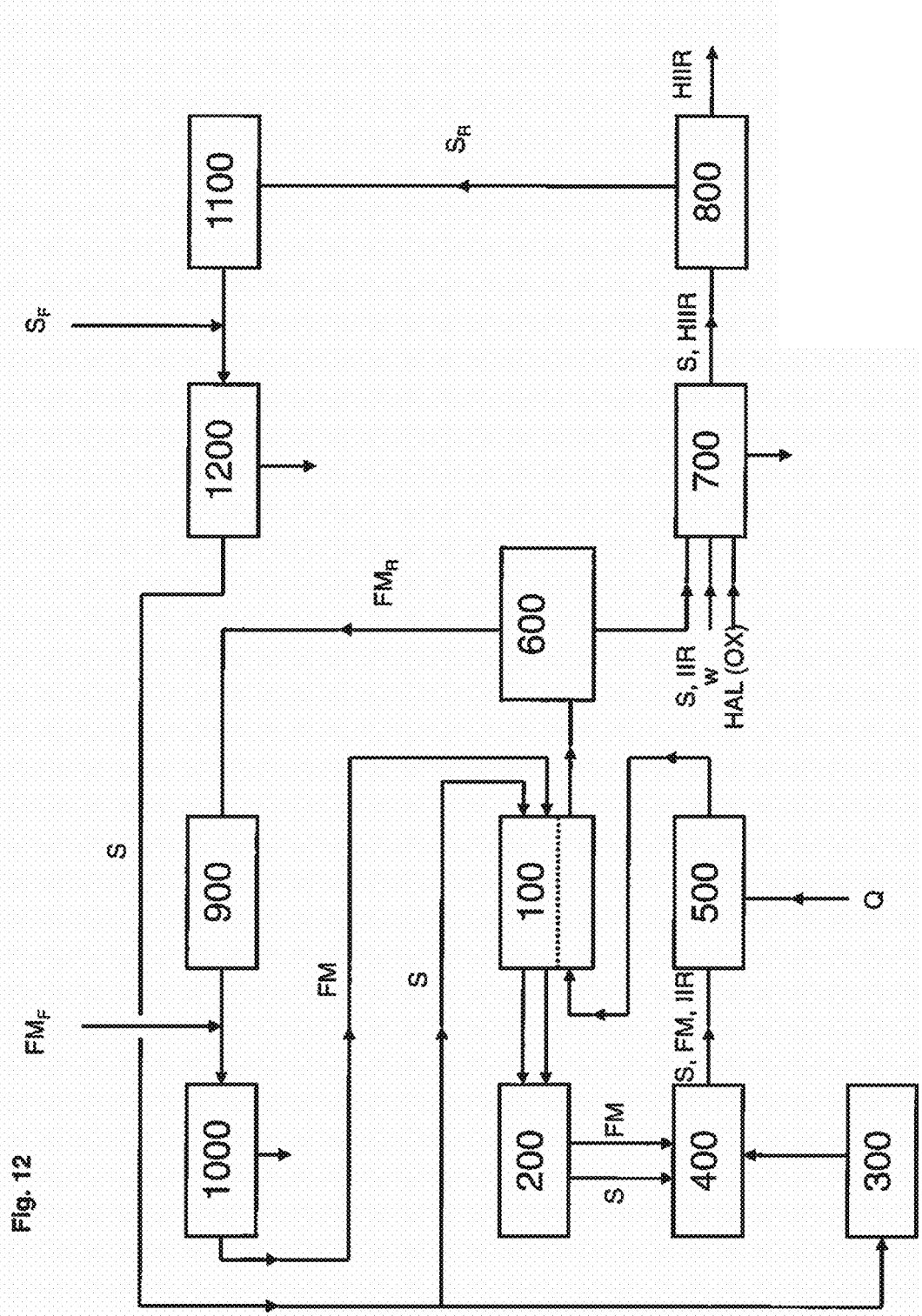

PROCESS FOR THE PRODUCTION OF WATER AND SOLVENT-FREE HALOBUTYL RUBBERS

This application is a continuation of pending U.S. patent application Ser. No. 13/635,954, filed Apr. 26, 2013 with the same title which claims the right of priority under 35 U.S.C. § 119 (a)-(d) and 35 U.S.C. § 365 of International Application No. PCT/EP11/54447, filed Mar. 23, 2011, which is entitled to the right of priority of European Patent Application Nos. 10003140.0, filed Mar. 24, 2010, and 10157706.2, filed Mar. 25, 2010, respectively, the contents of which are hereby incorporated by reference in their entirety.

The present invention relates to water and solvent-free halogenated butyl rubber products as well as a process for the production thereof.

Halogenated butyl rubbers have important industrial uses and are typically produced by the (co)polymerization of monomers, which is typically carried out via slurry, emulsion or solution processes.

Copolymerization of isobutene and isoprene, which leads to butyl rubber, for example is carried out industrially at low temperatures of approximately $-60°$ C. to $-100°$ C. to obtain high molar masses. The slurry process uses chloromethane as a diluent while the solution process uses an inert hydrocarbon as a solvent. After the polymerization, the butyl rubber polymer is present either as a slurry in chloromethane or as a homogeneous solution in a hydrocarbon. Unreacted monomers are also present in the reactor discharge mixture. The butyl rubber polymer needs to be recovered and isolated from the diluent or solvent.

After the (co)polymerization, the reactor discharge mixture contains at least the butyl rubber, solvents, residual monomers and the catalyst. To recover the butyl rubber, the discharge stream is typically treated with steam and hot water. Most of the solvent and the unreacted monomers are thereby flashed off. One disadvantage of the contact with steam and water is, that butyl rubbers are coagulated. The rubber polymers are then present in the form of wet crumbs in water. Most of the water is then be separated by draining, followed e.g. by the application of drying extruders and a final vacuum drying step.

In the slurry process, the polymerization reactor discharge stream is treated with steam and hot water in a flash drum. Most of the chloromethane and the unreacted monomers are thereby flashed off and the water is separated from the vapors by condensation. When the polymer from the reactor is to be processed further, such as by halogenations, the butyl rubber product may be recovered directly as a solution by discharging the reactor content into a hot solvent such as hexane. The chloromethane is evaporated after this stage and a further stripping stage is applied to remove remaining monomer residues.

In the solution process, an inert hydrocarbon solvent and an aluminium alkyl halide catalyst are applied during the polymerization step. The remaining monomers are then removed from the reactor solution in a distillation stripping process. After this distillation step, the butyl rubber polymer is present as a homogeneous solution in a hydrocarbon. This solution can either be processed further, such as being subjected to a halogenation step, or the butyl rubber polymer can be isolated directly from the solution. The isolation of the butyl rubber from solution is similar to that of the slurry process and also involves contact with steam and hot water, whereby the polymer coagulated. The butyl rubber polymer is then present in the form of wet crumbs in water (6 to 10 wt % polymer in water). To counteract the coagulation, salts of fatty acids are added in the flash drum containing the butyl rubber crumbs in water following the coagulation/steam stripping process. After the addition of additives, butyl rubber is then converted into the final commercial bale form through further drying. The drying is typically effected by draining, followed by the application of drying extruders and a final drying step in a fluidized bed.

One of the most commercially important chemical modification of butyl rubber is halogenation which leads to chlorinated and brominated butyl rubber, hereinafter also denoted as halobutyl rubbers or individually as bromobutyl rubber or chlorobutyl rubber.

Halobutyl rubber is technically produced by contacting a solution of regular butyl rubber in an alkane with chlorine or bromine in an agitated vessel. Said solution is generally denoted as cement. Unreacted halogen and hydrogen halide formed as byproduct are neutralized by the addition of a caustic solution. Additives can also be incorporated at that stage. The resulting solution is then steam-stripped to remove the solvent, thereby coagulating the rubber into a solid product. The solid product is generally recovered as a 5 to 12% slurry in water. Stabilizers and/or antioxidants are added to the halogenated butyl rubber immediately before recovery. The halogenated butyl rubber is then finished using mechanical drying equipment in a process analogous to that used for regular butyl rubber; however, because of the greater reactivity of the halogenated product, less severe conditions are employed.

The aforementioned processes for coagulation and steam stripping suffer from very high energy consumption. A large amount of steam is necessary not only to evaporate the solvent but also to heat and maintain the complete water content of the stripping drums at a high temperature. Additional steam addition is also necessary to strip off residual amounts of solvent by lowering the partial pressure of the solvent in the stripping drum.

The aforementioned processes also utilize a large amount of water because the concentration of butyl rubber in the slurry after coagulation is generally only 5 to 12% by weight and only 5% to 20% for halogenated butyl rubbers. All water from this slurry constitutes waste water and must be disposed of. While the waste water contains sodium salts from the neutralization, reworking and recycling the waste water to remove the sodium salts is not economically viable because the salt concentration is too low.

The rubber crumbs are separated from the bulk water mechanically using simple sieve trays or screens. The halogenated butyl rubber still contain approximately 30 to 50% water after this first separation. Further mechanical drying is then conducted using extruders by kneading the product and squeezing out the water. The disadvantage of this mechanical drying process is the contamination of water by small rubber particles that were not held back by the sieves with the result that the waste water requires additional treatment.

The aforementioned mechanical dewatering can only diminish moisture content down to approximately 5 to 15%. Additional thermal drying stages are then required. The halogenated butyl rubber is thereby heated to 150 to 200° C. under pressure in a single screw or twin screw extruder. A die plate is installed to maintain the pressure. When the halogenated butyl rubber is pushed through the die plate, the water in the rubber evaporates and forms open porous crumbs. A cutting device then cuts the crumbs into small pieces. The crumbs are conveyed to a convective dryer where residual moisture is removed by hot air. After such drying, the (halo)butyl rubber generally has a moisture content of 0.1 to 0.7%. A cooling stage, accomplished by flowing cold air through the rubber crumbs, is then needed to cool the halogenated butyl rubber crumbs down to the maximum baling temperature of 60° C. The crumbs are then formed into bales by hydraulic presses, and the bales are packed into boxes or crates for shipment.

The aforementioned processes for drying halogenated butyl rubbers is complex and requires extensive equipment. Furthermore, the process parameters must be carefully monitored to avoid heat and shear stress, which would accelerate degradation of the halogenated butyl rubber.

Various other special processes have been developed with the aim of removing water and volatile organic solvents from polymers. Extruder degassing in vacuum with or without the use of entrainers has gained acceptance in practical applications as the most important technique, however, the energy requirements of such prior art processes are quite high.

U.S. Pat. No. 3,117,953 A1 discloses an apparatus and process for purifying high pressure polyethylene. The substitution of synthetic rubber cement for polyethylene in U.S. Pat. No. 3,117,953 A1 would, however, result in crumbs being formed prior to entering the extruder, which is not desirable at all.

DE 195 37 113 discloses a method and an apparatus for polymer resins in particular polycarbonate resins using a steam stripper a decanter and an extruder. However, the introduction of steam would result in an undesireable high content of residual water or a very high energy consumption.

U.S. Pat. No. 4,055,001 discloses a method for the preparation of polymers such as butyl rubber having a water content of less than 0.1 wt.-% by using ultrasound sonotrodes during the drying process. However, the very high shear stress associated with the use of ultrasound is prohibitive for polymers such as halobutyl rubbers.

EP 0 102 122 discloses a method for polymer recovery from a solution, in particular for recovery of polyethylene, using a partially filled extruder. However. EP 0 102 122 is silent about the removal of residual water.

US 2001/056176 A1 discloses a one step method of recovering a polymer and specifically an example for the concentration of rubber solutions. The rubber solution is thereby heated with steam in order to remove existing solvents in one step by degassing under vacuum to produce white crumb. US 2001/056176 A1 thereby requires a large volumetric vapor flow to remove the volatile components at low vapor pressure and results in the enclosure of additional water in the crumbs, which water would subsequently need to be removed.

U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable.

EP 1 127 609 A2 discloses a process to treat a product in at least one kneader. EP 1 127 609 A2 uses energy introduced in part through the wall of the kneader itself to evaporate the solvent from solutions containing elastomers and thermoplastics. A kneader with a large surface area is therefore required as are high investment costs. Another portion of the energy is introduced via the rotating shaft of the kneader as mechanical energy. Mechanical energy is more expensive and therefore environmentally disadvantageous when compared to steam heating. The kneaders used in EP 1 127 609 A2 require a great deal of maintenance and cleaning. The introduction of mechanical energy via the kneader is furthermore strongly dependent on the viscosity of the product, which reduces the flexibility of the process.

EP 1 165 302 A1 discloses a device and method for degassing plastics. The apparatus in EP 1 165 302 A1 is an extruder with a rear vent and several vent sections operated under vacuum. The vacuum is needed to achieve low residual volatile concentrations. EP 1 165 302 A1 discloses that a stripping agent can be applied to further improve degassing efficiency. The plastic used in EP 1 165 302 A1, the thermoplastic polycarbonate, remains a flowing melt at the end of the degassing process. A synthetic rubber cement processed pursuant to EP 1 165 302 A1 would, however, convert to crumbs at the end of the degassing stage and could not be processed further.

In "Process Machinery", Parts I and II, March and April 2000; Author C. G. Hagberg, a direct volatilization of rubber solutions using a flash tank and an extruder is disclosed. However, this reference is silent about the contents of volatile compounds in the final product.

PCT/EP2009/062073 discloses a device and method for degassing non-volatile polymers. The device preferably comprises a twin screw extruder with a rear vent and several forward directed vent sections.

In view of the foregoing, an object of the present invention was therefore to provide a continuous, energy efficient, ecologically and economically favourable process to remove volatile compounds from a fluid containing at least one halogenated butyl rubber producing a halogenated butyl rubber product that is substantially free of volatile compounds.

This object is solved by a process of removing volatile compounds from a fluid containing at least one halogenated butyl rubber and at least one volatile compound which comprises at least the steps of:

a) treating the fluid in at least one concentrator unit comprising at least a heater, a degassing vessel and a vapor line, whereby the fluid is heated, the heated fluid is fed into a degassing vessel where part of the volatile compounds are removed via the vapor line to obtain a concentrated fluid, b) reheating the concentrated fluid from step a) in at least one reheating unit to obtain a reheated concentrated fluid;

c) feeding the reheated concentrated fluid from step b) into at least one extruder unit comprising at least an extruder degassing section comprising at least a conveying section, a vent port with one or more vapor lines, a accumulating section and an outlet section, whereby volatile compounds are removed through the vent ports and vapor lines;

whereby the product obtained at the outlet section is substantially free of volatile compounds.

It is pointed out that the scope of the invention also encompasses any desired combinations of the ranges and areas of preference specified for each feature.

In a preferred embodiment of the invention, the reheated concentrated fluid (L) is free-flowing. In the context of this invention, the term "free-flowing" means a viscosity in the range of 100 to 50,000,000 mPa*s, preferably 5,000 to 30,000,000 mPa*s and most preferably 10,000 mPa*s to 300,000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscous samples. The extrapolation is performed by taking a $2^{nd}$ order polynomial to reflect the shear stress vs shear rate graph obtained from the measurements. The linear portion of the polynomial reflects the slope at a shear rate of zero and thus is the zero shear viscosity.

In the context of this invention, the term "substantially free of volatile compounds" means a total concentration of volatile compounds of less than 1 wt %, preferably less than 0.5 wt % based on the mass of the non-volatile polymer.

In particular, the term "substantially free of volatile compounds" means substantially free of water and substantially free of volatile organic compounds.

Non-volatile polymers are considered to be substantially free of water, if the residual water concentration is less than 0.5 wt % preferably less than 0.25 wt %, more preferably less than 0.1 wt % and most preferably less than 0.075 wt % based on the mass of the polymer.

In the context of this invention, the term "volatile organic compounds" means organic compounds having a boiling point of below 250° C. at standard pressure.

Halogenated butyl rubbers are considered substantially free of volatile organic compound, if the residual concentration of said volatile organic compounds is less than 0.75 wt % preferably less than 0.25 wt % and most preferably less than 0.1 wt % based on the mass of the halogenated butyl rubber. Said volatile organic compounds are typically the solvents employed in the halogenation step following polymerization and include hydrocarbons like hexanes and pentanes.

As used herein, the term halogenated butyl rubber includes bromo- and chlorobutyl rubbers, brominated and/or chlorinated terpolymers such as those described in U.S. Pat. No. 6,960,632 and Kaszas et al., Rubber Chemistry and Technology, 2001, 75, 155 where para-methylstyrene is added to the mixed feed of butyl polymerizations (Methyl chloride, isobutylene and isoprene mixed feed, with aluminum trichloride/water mixtures as initiator) resulting in a high molecular weight polymer with up to 10 mol % of styrenic groups randomly incorporated along the polymer chain The incorporation of para-methylstyrene is found to be uniform throughout the molecular weight distribution due to the similarity in reactivity with isobutylene. The isoprene moieties within the butyl terpolymers can be brominated by conventional methods. Alternatively, a brominated and/or chlorinated terpolymer may comprise a $C_4$ to $C_7$ isomonoolefin, such as isobutylene, and a comonomer, such as para-alkylstyrene, preferably para-methylstrene. The aforementioned copolymers are commercially available under the tradename EXXPRO 3035, 3433, 3745. When halogenated, some of the alkyl substituent groups present in the styrene monomer units contain a benzylic halide formed from halogenation of the polymer.

In the context of this invention butyl rubber preferably denotes a (co)-polymer of isobutene (2-methylpropene) and isoprene (2-methylbuta-1,3-diene). On a molar basis, the isoprene content in the polymer is between 0.001% and 20, preferably between 1.8 and 2.3 mol %. Butyl rubber is composed of linear polyisobutene chains with randomly distributed isoprene units. The isoprene units introduce unsaturated sites into the polymer chain to enable vulcanization. The mass average molecular weight of butyl rubber molecules Mw is typically between 50,000 and 1,000,000 g/mol, preferably between 300,000 and 1,000,000 g/mol.

The halogenated butyl rubbers also contain a certain amount of halogen chemically bound to the rubber molecules. The amount of chemically bound halogen is typically in the range of more than 0 to 8 wt % with respect to total mass of the polymer. The halogenated butyl rubbers may also contain additives, e.g. 0.0001 to 4 phr (phr=parts per hundred rubber with respect to rubber weight), epoxidized soy bean oil (ESBO), 0.0001 to 5 phr calcium-stearate and 0.0001 to 0.5 phr antioxidants. Other additives are also applicable, dependent on the application of the butyl rubber product, i.e. fillers or colorants.

In case of bromobutyl rubber, the typical bromine content in the finished product is 1.5 to 5 wt %, preferably 1.6 to 2.0 wt %.

In case of chlorobutyl rubber, the typical chlorine content in the finished product is 1.0 to 5 wt %, preferably 1.15 to 1.35 wt %.

The subject of the invention will be described in more detail by means of schematic drawings in which:

FIG. 12 shows a flow chart for a preferred process.

Figure 1:
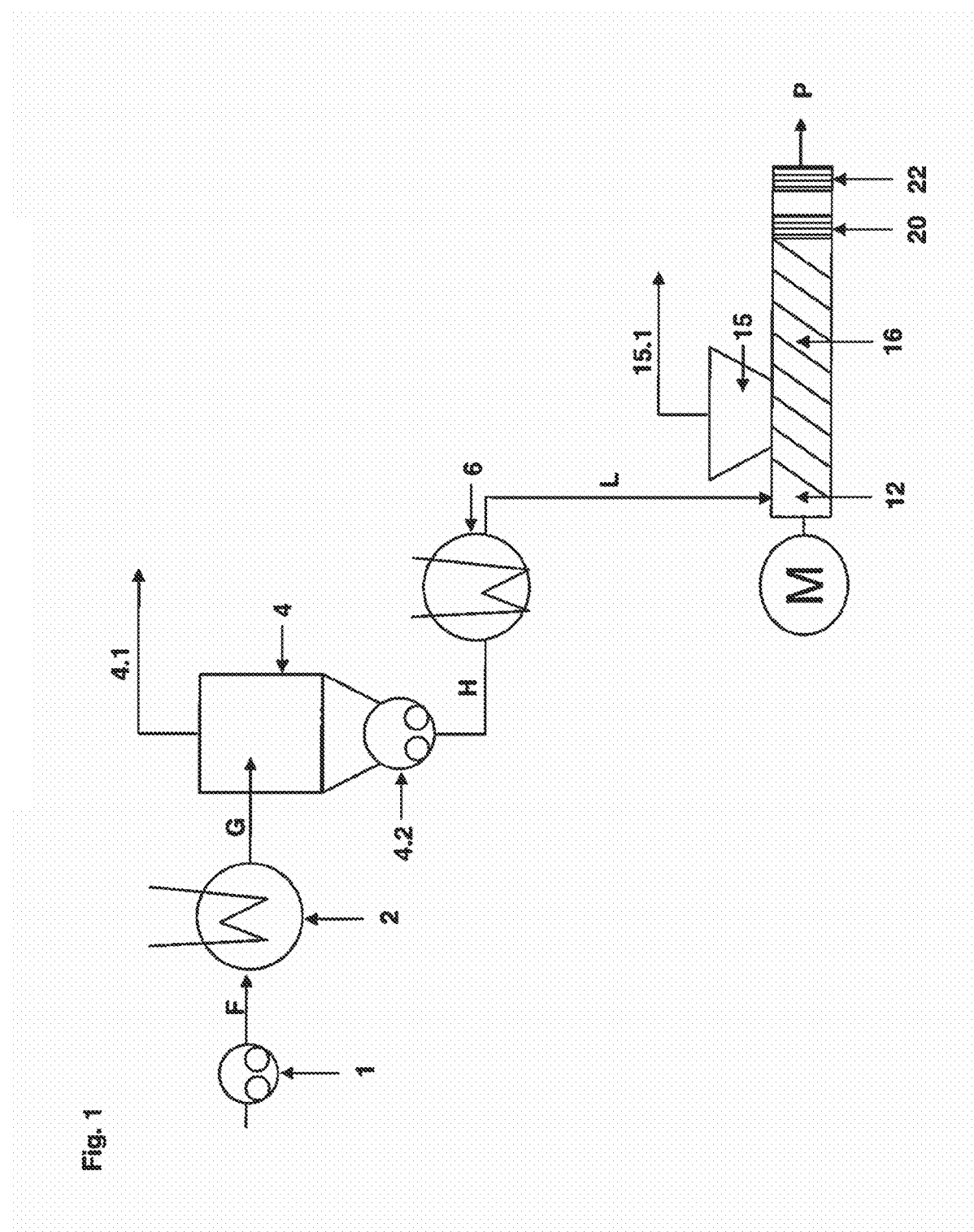
FIG. 1 shows a single-stage concentrator unit, a reheating unit and an extruder unit comprising one extruder degassing section, one accumulating section and one outlet section.

A basic and exemplary embodiment of the process step is shown in FIG. 1. In step a) Fluid F containing at least one halogenated butyl rubber and at least one volatile compound is transferred via pump 1 to the heater 2, where the fluid F is heated.

Fluid F, also called cement, contains for example from 3 to 50 wt % of a halogenated butyl rubber and from 60 to 97 wt % volatile compounds, in particular a solvent or a solvent and water, whereby the aforementioned components add up to 90 to 100, preferably 95 to 100 wt % of the total mass of fluid F.

The solvent is preferably selected from the group consisting of linear or branched alkanes having between 4 and 10 C atoms, preferably 4 to 7 C atoms. More preferred solvents are n-pentane, iso-pentane, n-hexane, cyclohexane, iso-hexane, methyl-cyclopentane, methyl-cyclohexane and n-heptane as well as mixtures comprising or consisting of those alkanes.

In a preferred embodiment of the invention, fluid F contains from 3 to 40 wt % of a halogenated butyl rubber from 60 to 95 wt % volatile organic compounds, in particular a solvent, and from 0.5 to 20 wt % water, whereby the aforementioned components add up to 95 to 100 wt % of the total mass of fluid F.

The fluid F is typically obtained from halogenation of butyl rubber. Fluids F containing water are typically obtained after steam stripping processes following the polymerization.

The fluid F entering the heater typically and preferably has a temperature of 10° C. to 100° C., preferably of 30° C. to 80° C. The viscosity of fluid F is for example in the range of 100 mPa*s to 25,000 mPa*s, preferably in the range of 500 mPa*s to 5,000 mPa*s.

A heater may be any device that is able to raise the temperature of Fluid F. In a preferred embodiment, heater 2 is a heat exchanger. The heating medium is selected from the group consisting of steam, heating oil or hot pressurized water. The heat exchanger is for example of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer. Said heat exchangers are well known and commercially available. In a less preferred embodiment Plate type heat exchangers may also be applied.

Upon heating, heated fluid G is obtained. The heated fluid G has a higher temperature than fluid F, preferably a temperature of 100 to 200° C., more preferably 110° C. to 190° C. and even more preferably 120° C. to 175° C. The heated fluid G is then conveyed further into a degassing vessel 4. In the degassing vessel, the volatile compounds at least partially evaporate. The vapors are separated and removed from the heated fluid G by a vacuum line 4.1. The pressure in the degassing vessel 4 is for example in the range of 100 hPa to 4,000 hPa, preferably in the range of 200 hPa and 2,000 hPa and more preferred in the range of 230 to 1,100 hPa.

The vapors removed via the vacuum line 4.1 are preferably condensed and recycled into the process for preparation of fluid F. After degassing and separation a concentrated fluid H is obtained, which is removed from the degassing vessel 4 by means of a pump 4.2.

Generally the degassing vessel may be a flash evaporator or another device typically used to remove volatile compounds while simultaneously having short retention times.

In a preferred embodiment of the invention the degassing vessel is designed in the shape of a cyclone to further aid separation of vapor from heated fluid G. In another preferred embodiment of the invention the degassing vessel 4 has a conical or at least torisperical shaped bottom, to allow the vessel being emptied completely or substantially complete.

In another embodiment the inner surface of the degassing vessel can be heated.

The pump 4.2 is preferably directly connected to the outlet of the degassing vessel 4. In general, the connection piece between pump and vessel is preferably as short as possible.

Due to the high viscosity of the concentrated fluid H at this stage, the inlet of the pump is preferably designed with a large inlet, thereby reducing the pressure drop at the inlet. The inlet comprises a cross sectional area $A_{inlet}$ and the degassing vessel comprises an inner surface $A_{degas}$, wherein the ratio $A_{inlet}/A_{degas}$ is particularly $0.001 \leq A_{inlet}/A_{degas} \leq 0.4$, preferably $0.01 \leq A_{inlet}/A_{degas} \leq 0.3$, more preferred $0.05 \leq A_{inlet}/A_{degas} \leq 0.25$ and most preferred $0.1 \leq A_{inlet}/A_{degas} \leq 0.2$.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step a) is for example dependent on the temperature of fluid G and the pressure in the degassing vessel 4. In a preferred embodiment of the invention the temperature of fluid G and the pressure in the degassing vessel 4 are chosen so that the concentrated fluid H is preferably free-flowing as defined above and comprises for example from 10 to 60, preferably from 25 to 60 wt % of a non-volatile polymer, preferably a synthetic rubber and more preferably (halo)butyl rubber and from about 40 to about 90, preferably from 40 to 75 wt % volatile compounds whereby the aforementioned components non-volatile polymer, volatile organic compound and water add up to 90 to 100 wt %, preferably to 95 to 100 wt % of the total mass of fluid H.

In a preferred embodiment and where the feedstock fluid F comprises water, fluid H for example comprises from 10 to 60, preferably from 25 to 60 wt % of a non-volatile polymer, preferably a synthetic rubber and more preferably (halo)butyl rubber, from about 25 to about 90, preferably from 25 to 75 wt % volatile organic compounds, in particular a solvent, and about 0.5 to about 15 wt % water, whereby the aforementioned components non-volatile polymer, volatile organic compound and water add up to 90 to 100 wt %, preferably 95 to 100 wt % of the total mass of fluid H.

The temperature of the concentrated fluid H is lower than that of heated fluid G and is for example in the range of 15 to 100° C., preferably in the range of 30 to 100° C. The pressure of the heated fluid G is for example in the range of 2 to 60 bar, preferably in the range of 4 to 30 bar. The concentrated fluid H is preferably free-flowing as defined above.

In step b), the concentrated fluid H obtained in step a) is then passed through a reheating unit 6 to obtain a reheated concentrated fluid L. The a preferred embodiment the reheating unit comprises a heat exchanger, whereby the same disclosure including the preferences with regard to heating media and heat exchanger types apply as described above for heat exchanger 2.

The temperature of the reheated concentrated fluid L is higher than that of the concentrated fluid L and is for example in the range 50° C. to 200° C., preferably in the range of 90° C. to 180° C. The pressure of the heated fluid G is for example in the range of 2 to 60 bar, preferably in the range of 4 to 30 bar. The reheated concentrated fluid L is preferably free-flowing as defined above.

In step c), the reheated concentrated fluid L obtained in step b) is passed on to a extruder unit and fed into the conveying section 16 of the extruder degassing section at the feeding point 12.

Suitable extruder types include single screw and multi-screw extruders comprising any number of barrels and types of screw elements and other single or multishaft conveying kneaders. Possible embodiments of multiscrew extruders are twin-screw extruders, ring extruders or planetary roller extruders, whereby twin-screw extruders and planetary roller extruders are preferred.

Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

Preferred extruder materials should be non-corrosive and should substantially prevent the reheated concentrated fluid L and the Product P from being contaminated with metal or metal ions.

Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond like carbon (DLC).

The conveying section 16 is open to a vent port 15. In the conveying section 16 a part of the solvent is evaporated and separated from the reheated concentrated fluid L. The vapors are removed through the vent port 15 via a vapor line 15.1.

Since the evaporation volatile compounds have a tendency to entrain the reheated concentrated fluid L or the product P towards the vent ports, in a preferred embodiment of the invention the vent ports 15 are designed to prevent the material, in particular the reheated concentrated fluid L or the Product P, from coming out of the vent ports.

Suitable means to accomplish that purpose are stuffer screws, that are mounted on the vent ports and convey any material back into the extruder, or rollers or belts, that are applied to the inside of the vent ports to push deposited material back into the extruder.

Stuffer screws are preferred. The stuffer screws may comprise one two or more shafts, whereby stuffer screws comprising one or two shafts are preferred.

As an alternative or in addition to the aforementioned, coatings of the vent ports may be applied which reduce or prevent sticking of the material to the surface. Suitable coatings include DLC, Ethylene-Tetrafluoroethylene (ETFE), Polytetrafluoroethylene (PTFE) and Nickel-Alloys.

The pressure at the vent port 15 is for example between 1 hPa and 2,000 hPa, preferably between 5 hPa and 900 hPa.

The vapor line 15.1 may be and is preferably connected to a condensing system.

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of fluid F or A as defined below.

The conveying section 16 is terminated by a accumulating section 20. The purpose of the accumulation is to assure a certain pressure level in the vent port 15 and to introduce mechanical energy into the material to facilitate evaporation of volatile compounds. The accumulating section 20 may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneading elements may be assembled in any combination on the screw shafts of the extruder, in particular of an twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds For planetary roller extruders, kneading elements like tooth shaped rollers are or rollers with grooves and clearances are preferred.

Generally the extruder unit may comprise one or more conveying sections and one or more accumulating sections, whereby the number is only limited by constructional constraints. A typical number of conveying sections and accumulating sections is 1 to 30, preferably 2 to 20 and more preferably 3 to 15.

The last accumulating section 20 is typically designed to form a product plug at the outlet of the extruder, thereby preventing surrounding air from entering the extruder. While passing from the conveying section 16 and the accumulating section 20 to the outlet section 22 the reheated concentrated fluid L undergoes a transition from the preferably free-flowing reheated concentrated fluid L to the product P, which typically has a crumbly appearance.

The outlet section 22 typically comprises means to allow the product to exit the extruder and optionally but preferably product processing equipment. Examples of suitable product processing equipment includes combinations of die plates and cutters; die plates und underwater-pelletizing means; means for crumb formation like screw elements with teeth and holes; turbulators which may be designed as cylinders with holes in it, whereby the product is pressed from the outside to the inside of the cylinder, and whereby a rotating knife inside the cylinder cuts the product into pieces; fixed knifes placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include pneumatic crumb conveyers with convective air cooling, vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

The product P may then be processed further for final packing and shipping. Halogenated butyl rubbers are typically cooled to a temperature of or below 60° C., formed into bales e.g. by a hydraulic press, and then packed into boxes or crates for shipment.

In general, an increasing feed rate of the reheated concentrated fluid L at the feeding point 12 requires a corresponding increase in the screw speed of the extruder. Moreover, the screw speed determines the residence time of fluid L. Thus, the screw speed, feed rate and the extruder diameter are typically interdependent. Typically the extruder is operated in such a manner that the dimensionless throughput $V/(n*d^3)$, wherein V denotes the Volume flow rate, n the screw speed expressed in revolutions per minute and d the effective diameter of the extruder is adjusted to about 0.01 to about 0.2 preferably to about 0.015 to about 0.1. The maximum and minimum feed rates and extruder screw speeds are determined by for example the size of the extruder, the physical properties of the halogenated butyl rubber contained in Fluid L and the target values of remaining volatile compounds. Given these properties, however, the operating parameters can be determined by one skilled in the art by some initial experiments.

In one embodiment of the invention the extruder is operated at a feed rate of 5 to 25,000, preferably of 5 to 6,000 kilograms per hour.

Generally, the degassing in the extruder may be aided by the addition of a stripping agent that is removed together with other volatile compounds. Even though the stripping agent may be added anywhere in the extruder unit, the addition in one or more accumulating sections is preferred. In a more preferred embodiment a stripping agent is added in one or more accumulating sections except the last one 20.

Suitable stripping agents are substances that are inert to the reheated concentrated fluid L and/or the product P and have a vapor pressure greater than 100 hPa at 100° C.

In the context of the invention, the term "inert" means that the stripping agent does not or virtually not react with the polymers contained in the reheated concentrated fluid L and/or the product P. Suitable stripping agents are nitrogen, carbon dioxide, noble gases, propane, butane, water or a mixture of the aforementioned substances, whereby carbon dioxide is preferred. The amount of stripping agent may be 0.0001 to 10, preferably 0.001 to 5 and more preferably 0.1 to 2 wt-% based on the amount of the polymer product obtained at the outlet section.

Figure 4:
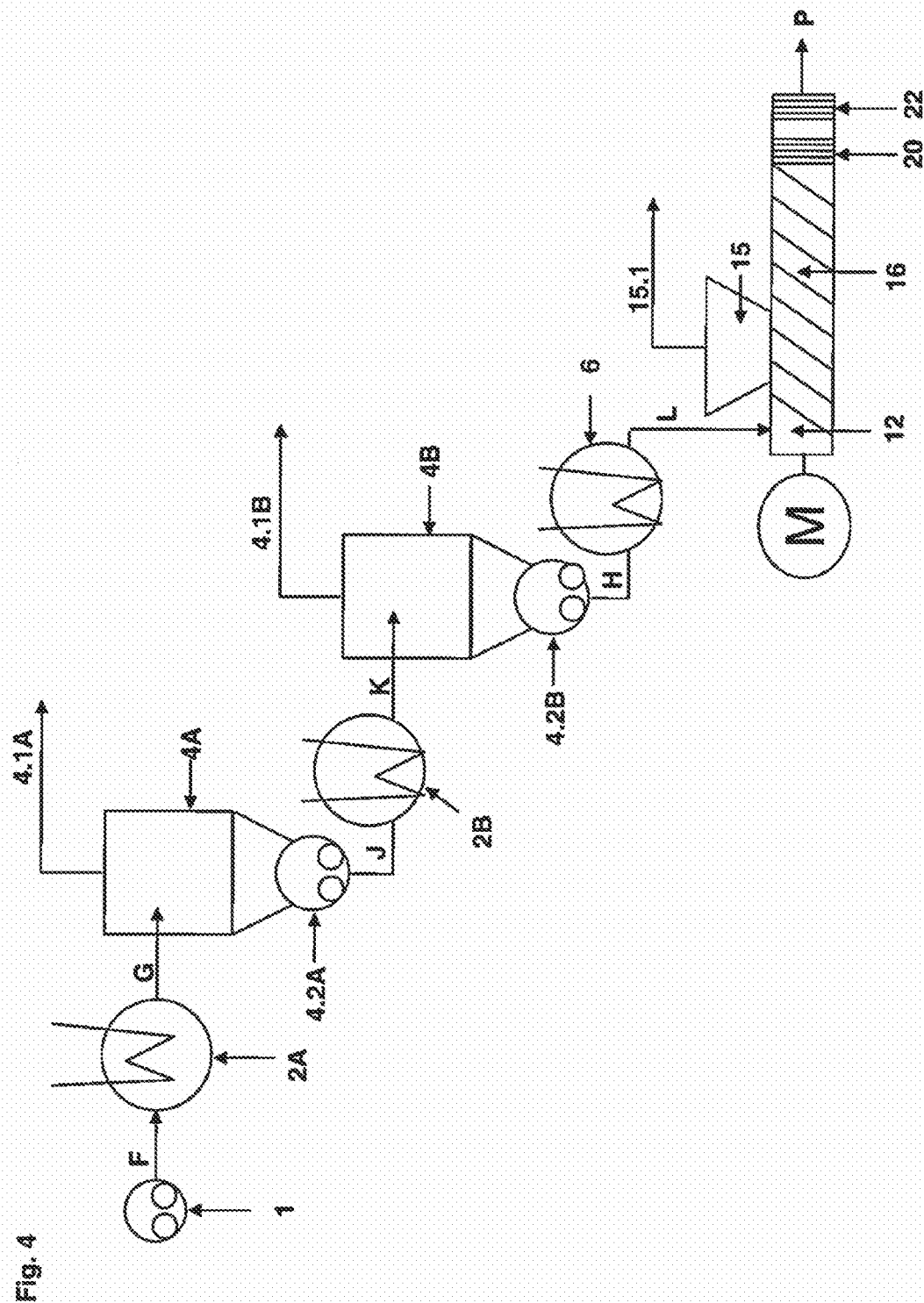
FIG. 4 shows a double-stage concentrator unit, a reheating unit and an extruder unit comprising one extruder degassing section, one accumulating section and an outlet section.

The heating stream of the heating unit 6 may be used after heating the concentrated fluid H for heating the fluid F in the heater 2. The heating stream of the reheating unit 6 may be in communication with the heater 2. In addition or in alternate the heating stream leaving the heating unit 6 and/or the heating stream entering the reheating unit 6 may be in communication with a further reheating unit 6 and/or a further heater 2 as illustrated in FIG. 4. Preferably the heating stream leaving the reheating unit 6 and/or the heating stream entering the reheating unit 6 may be in communication with one or more degassing vessels 4 and/or in communication with one or more extruder units. Further it is possible that the heating stream leaving the heater 2 and/or the heating stream entering the heater 2 may be in communication with one or more degassing vessel 4 and/or in communication with one or more extruder units. Particularly preferred the heating stream of the heater 2 and/or of the reheater unit 6 are led in counter flow with respect to the heated fluids. Due to a suitable connection of the heating streams of the heater 2, the reheating unit 6 and if so the degassing vessel 2 and/or the extruder unit a large amount of the heat content of the heating stream can be used. This leads to an increased energy efficiency with respect to the required heat flows at different devices. If necessary, the heating stream may be heated additionally between two different devices for controlling a required temperature of the heating stream. In most cases this additional heating of the heating stream may take place at lower temperatures and at a lower energy level compared to the environment so that the additional heating of the heating stream can be facilitated and enables a better efficiency.

Figure 2:
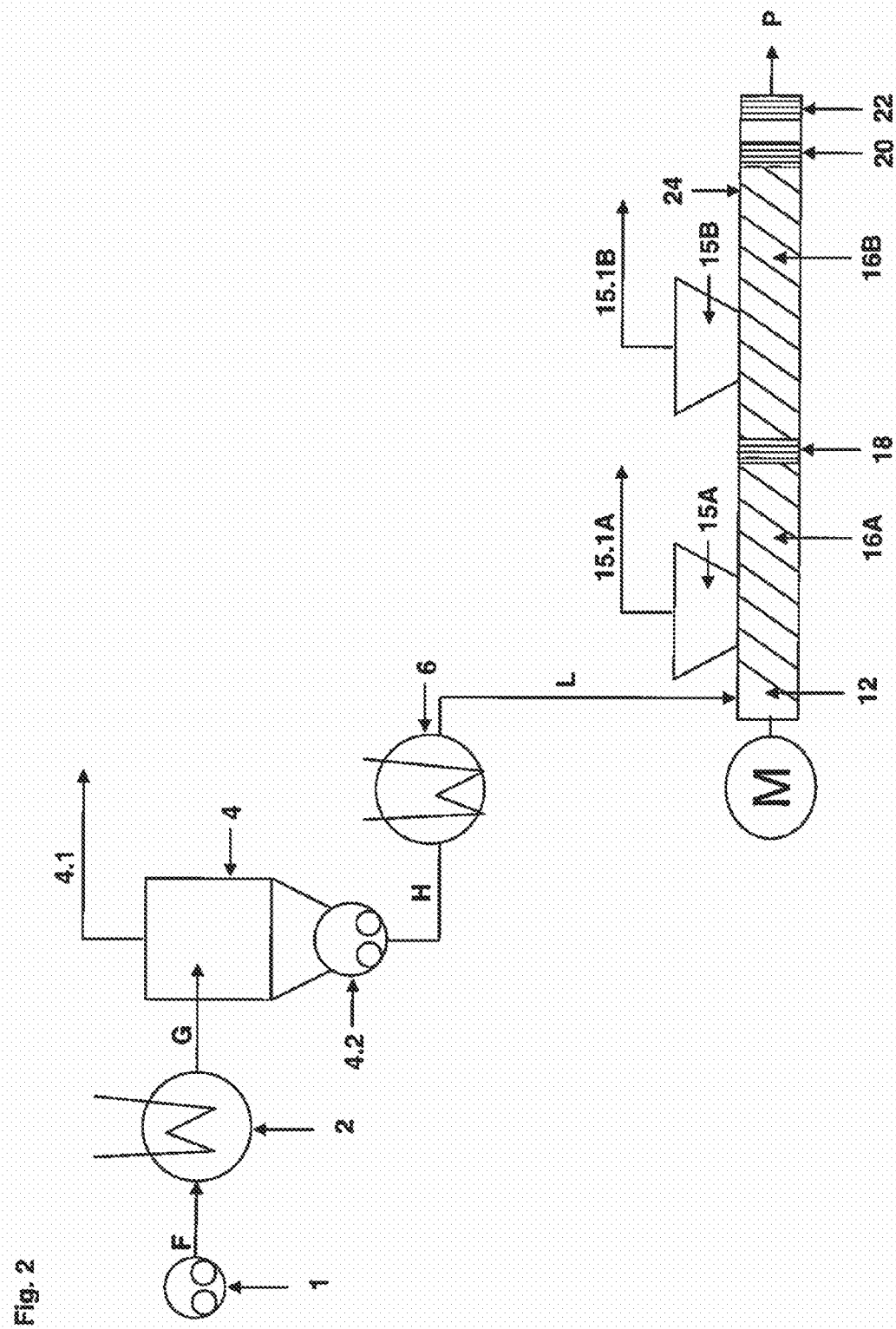
FIG. 2 shows a single-stage concentrator unit, a reheating unit and an extruder unit comprising two extruder degassing sections, two accumulating sections and one outlet section.

Another embodiment of the invention is shown in FIG. 2. FIG. 2 shows another flow chart and suitable device for the accomplishment of the process according to the invention comprising a concentrator unit with a pump 1, a heater 2, a degassing vessel 4, a vapour line 4.1 and a pump 4.2, a reheating unit comprising a reheater unit 6 and an extruder unit comprising two extruder degassing sections having two conveying sections 16A and 16B each connected to a vent port 15 A and 15 B and a vapour line 15.1A and 15.1.B, two accumulating sections 18 and 20 terminating the conveying sections 16 A and 16 B a an outlet section 22. In addition to that the extruder unit further comprises a side feeder 24.

Generally, the extruder unit may comprise one or more side feeders, which may positioned anywhere in the extruder, preferably in close proximity to the feeding point or the outlet section 22. Side feeders are suitable for the addition of additives to the polymer.

Examples of additives halogenated butyl rubber products include stabilizing agents, acid scavengers like ESBO (epoxidized soy bean oil), stearates like calcium stearates, antioxidants and the like. Examples of suitable antioxidants include sterically hindered phenols like butylhydroxytoluenes and its derivatives like Inganox 1010 and 1076, amines, mercapto-benzimidazoles, certain phosphites and the like.

In particular, halogenated butyl rubber are mixed with additives, e.g. 0.0001 to 4 phr epoxidized soy bean oil (ESBO), 0.0001 to 5 phr calcium-stearate and 0.0001 to 0.5 phr of antioxidants (phr=parts per hundred rubber with respect to rubber weight). Other additives are also applicable, dependent on the application of the butyl rubber product, i.e. fillers or colorants.

As an alternative or in addition to that, additives may also already be added to the fluid F or, as far as they are liquid together with the stripping agent.

In a preferred embodiment of the invention step a) is repeated a least once, preferably once or twice. The advantage of repeating step a) is that the total energy consumption to produce the concentrated fluid H can significantly reduced due to easier operation parameter optimization for each concentration unit. The repetition of step a) is preferably accomplished by connecting the respective number of concentrating units in series.

An example of this embodiment is shown in FIG. 4. FIG. 4 shows another flow chart and suitable device for the accomplishment of the process according to the invention comprising a double-stage concentrator unit with a pump 1, a first concentrator unit comprising heater 2A, degassing vessel 4A equipped with a vapour line 4.1A and a pump 4.2A, a second concentrator unit comprising heater 2B, degassing vessel 4B equipped with a vapour line 4.1B and a pump 4.2B, a reheating unit 6 and an extruder unit connected to a vent port 15 A and a vapour line 15.1A. The heated fluid G is subjected to the first concentration stage, thereby obtaining pre-concentrated fluid J, which is then reheated by heater 2B to obtain the reheated pre-concentrated fluid K, which is then subjected to the second concentration stage, whereby concentrated fluid H is obtained. Concentrated fluid H is then processed further as described above.

In a preferred embodiment of the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

Figure 3:
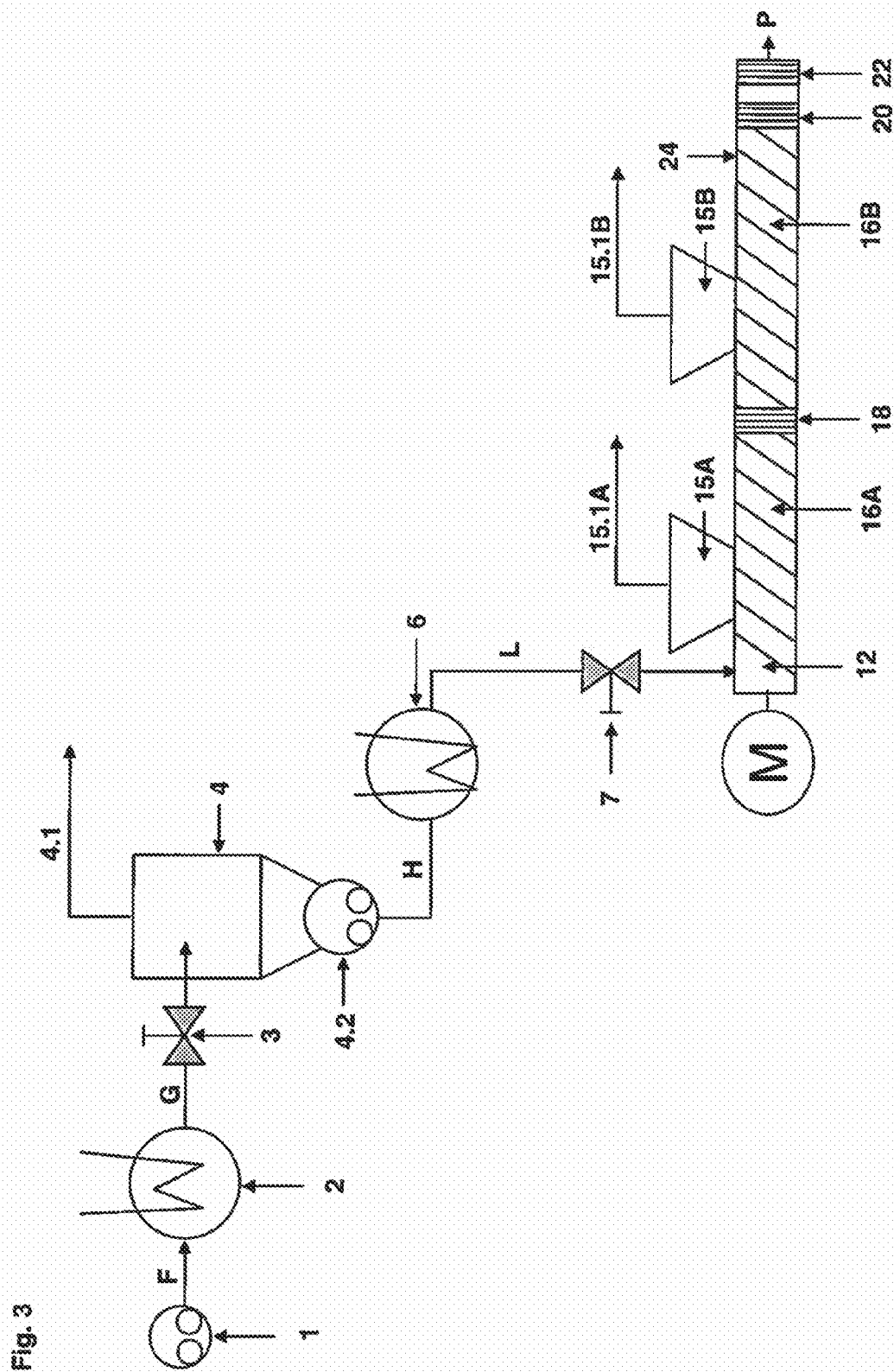
FIG. 3 shows a single-stage concentrator unit having a pressure relief valve, a reheating unit and an extruder unit having a pressure relief valve and further comprising two extruder degassing sections, two accumulating sections, a side feeder and an outlet section.

A further embodiment of the invention having additional pressure control devices is shown in FIG. 3 which is apart form the pressure control devices very similar to FIG. 2. The pressure of heated fluid G is controlled by the pressure control device 3, the pressure of reheated, concentrated fluid L entering the extruder is controlled by the pressure control device 7.

In a preferred embodiment of the invention the reheated concentrated fluid L is injected into the first extruder degassing section of the extruder unit, whereby the first extruder degassing section comprises one or more rear vent ports in upstream direction each connected to a vapor line.

The advantage of rear vent ports is that the volatile compounds present in the reheated concentrated fluid L undergo sudden and rapid evaporation, thereby effecting at least partial separation of the synthetic rubber product and the volatile compounds, the vapors emerging through the rear vents in upstream direction. Generally, from about 50 to about 99 wt-%, of the volatile compounds present in the fluid L is removed through the upstream vents.

Figure 5:
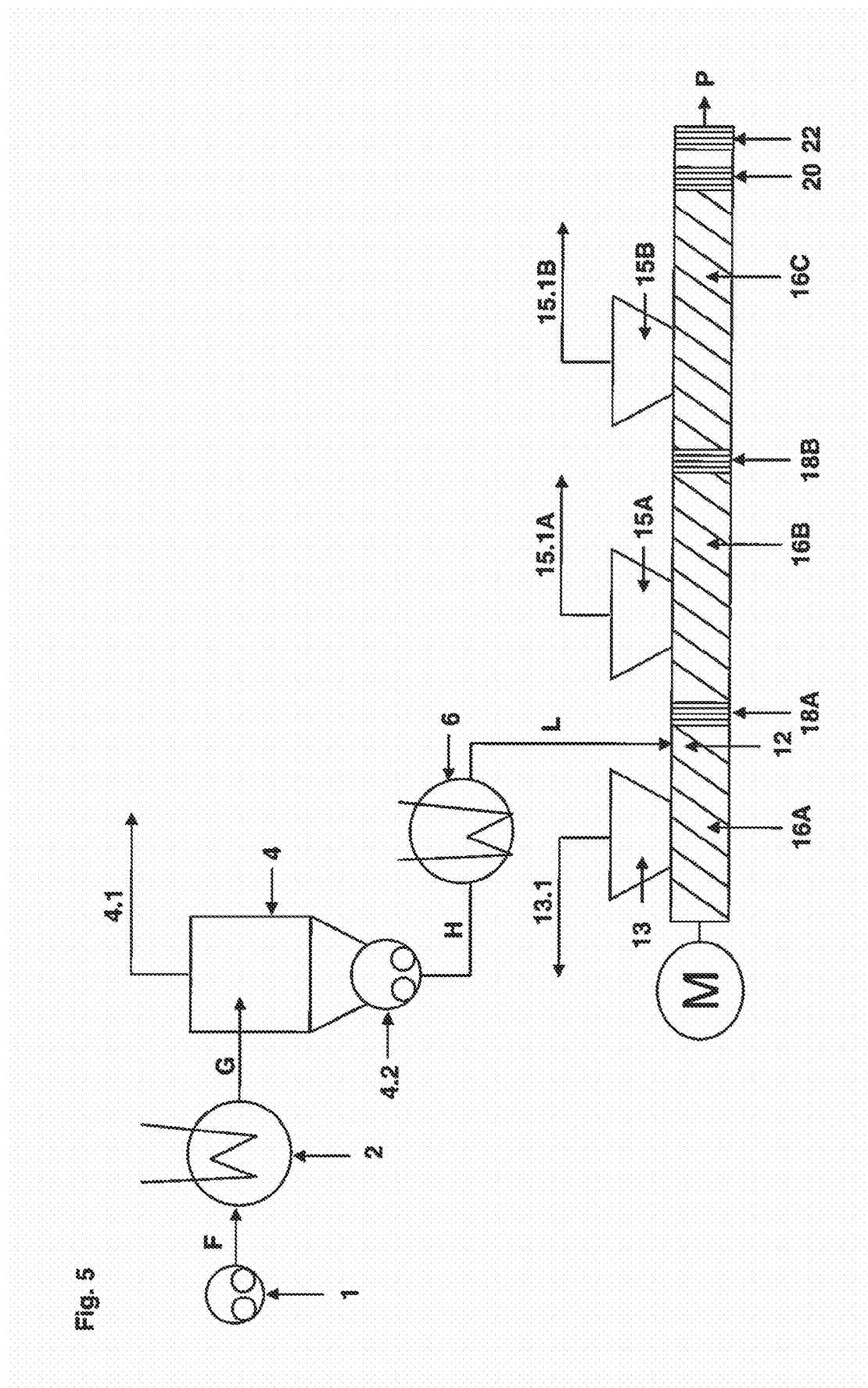
FIG. 5 shows a single-stage concentrator unit, a reheating unit and an extruder unit comprising three extruder degassing sections, three accumulating sections and one outlet section, whereby one extruder degassing section is a backward degassing section.

An example of this embodiment is shown in FIG. 5. FIG. 5 shows another flow chart and suitable device for the accomplishment of the process according to the invention comprising a single-stage concentrator unit with a pump 1, a concentrator unit comprising heater 2, degassing vessel 4 equipped with a vapour line 4.1 and a pump 4.2, a reheating unit 6 and an extruder unit comprising three extruder degassing sections, whereby the feeding point 12 is located at the first extruder degassing section, comprising a conveying section 16A, a rear vent port 13 connected to a vapor line 13.1 in upstream direction and whereby the extruder unit further comprises two downstream extruder degassing sections each comprising a conveying section 16 B and 16 C, a vent port, 15 A and 15B, whereby the vent ports 15A and 15B are each connected to a vapour line 15.1A and 15.1B, and whereby each of the conveying sections 16A, 16B and 16C is terminated by a accumulating section 18A, 18B and 20 and whereby the extruder unit further comprises an outlet section 22. Generally the streams are processed as described above with the difference being that large amounts of fluid compounds present in the reheated concentrated fluid L are already removed via vent port 13 and the vapour line 13.1 connected thereto.

Figure 6:
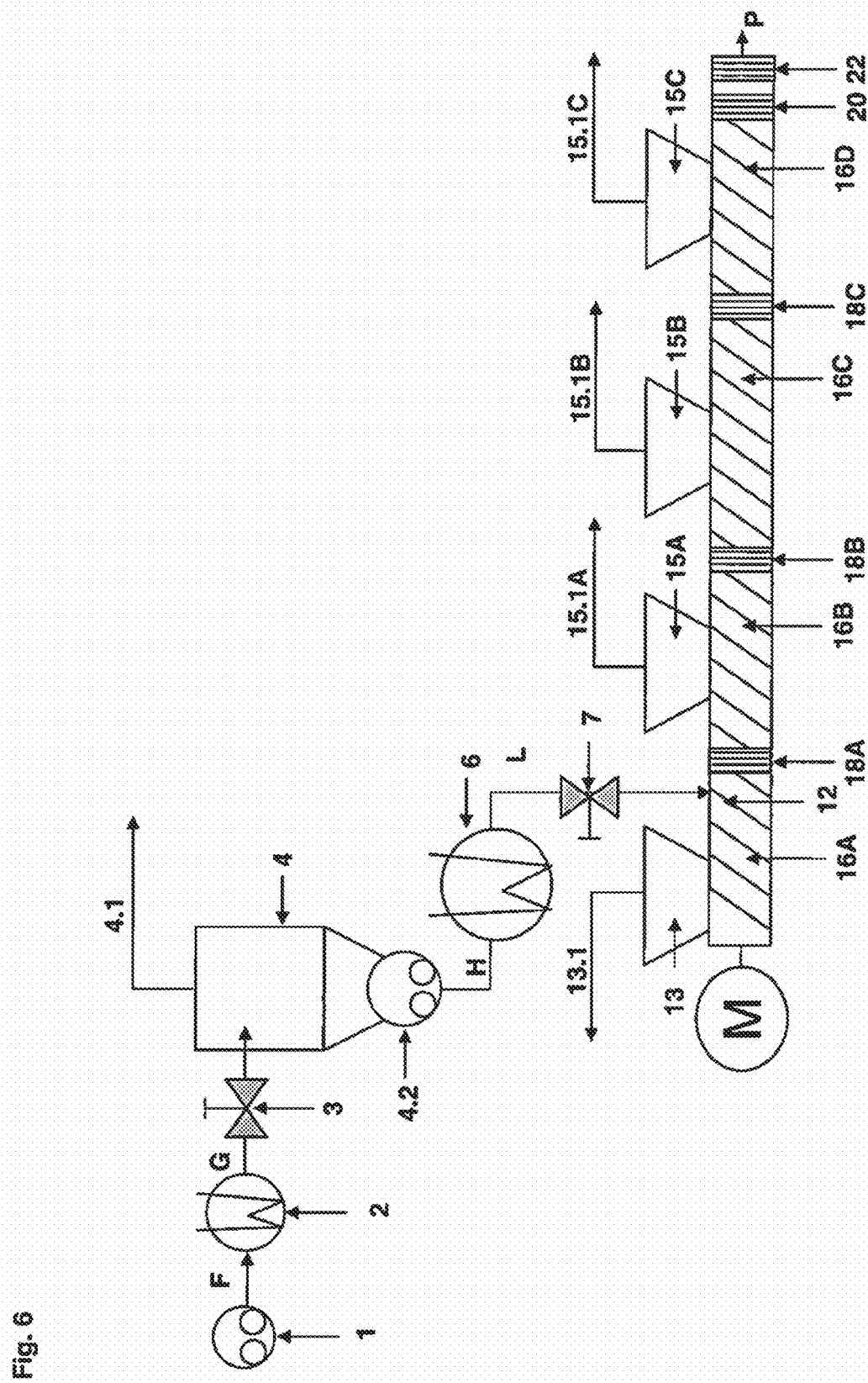
FIG. 6 shows a single-stage concentrator unit comprising a pressure regulation device, a reheating unit and an extruder unit comprising a pressure regulation device, four extruder degassing sections, four accumulating sections and one outlet section, whereby one extruder degassing section is a backward degassing section.

Another example of this embodiment is shown in FIG. 6. FIG. 6 shows another flow chart and suitable device for the accomplishment of the process according to the invention comprising a single-stage concentrator unit with a pump 1, a concentrator unit comprising a pressure control device 3, a heater 2, a degassing vessel 4 equipped with a vapour line 4.1 and a pump 4.2, a reheating unit comprising a heater 6 and an extruder unit comprising a pressure control device 7 upstream the feeding point 12 of the extruder, four extruder degassing sections, whereby the feeding point 12 is located at the first extruder degassing section, whereby the first extruder degassing section comprises a conveying section 16A, a rear vent port 13 connected to a vapor line 13.1 in upstream direction and whereby the extruder unit further comprises three downstream extruder degassing sections each comprising a conveying section. 16 B, 16 C and 16D, a vent port, 15A, 15B and 15C, whereby the vent ports 15A, 15B and 15C are each connected to a vapour line 15.1A, 15.1B and 15C, and whereby each of the conveying sections 16A, 16B, 16C and 16D is terminated by a accumulating section 18A, 18B, 18C and 20 and whereby the extruder unit further comprises an outlet section 22. Generally, the streams are processed as described above.

Fluid F, which is fed into the heater 2 typically, and as already disclosed above, contains for example from 3 to 50 wt % of a non-volatile polymer, preferably a synthetic rubber and more preferably a (halo)butyl rubber and from 60 to 97 wt % volatile compounds, in particular a solvent or a solvent and water, whereby the aforementioned components add up to 90 to 100, preferably 95 to 100 wt % of the total mass of fluid F and in a preferred embodiment from 3 to 40 wt % of a non-volatile polymer, preferably a synthetic rubber and more preferably (halo)butyl rubber, from 60 to 95 wt % volatile organic compounds, in particular a solvent, and from 0.5 to 20 wt % water, whereby the aforementioned components add up to 95 to 100 wt % of the total mass of fluid F.

Dependant on the source of fluid F it further may contain hydrophilic compounds which need to be removed to a certain extend in order to met the desired product specifications.

Furthermore, where fluid F contains water, it is desirable to lower the water content in order to improve the process with respect to its energy consumption.

It was found that a significant reduction of remaining hydrophilic compounds or water or both can be achieved in an advantageous way by preparing the fluid F in a process of removing hydrophilic compounds and optionally water from a crude fluid A containing at least one non-volatile polymer, at least one volatile organic compound, one or more hydrophilic compounds and optionally water which comprises at least the step of pre a) treating the crude fluid A in at least one pre-washing unit comprising at least a separating apparatus 26, whereby the fluid A is mixed with water to obtain an organic phase 28 comprising primarily non-volatile polymer and volatile organic compounds and an aqueous phase 27 comprising primarily water and hydrophilic compounds, and whereby the organic phase 28 is separated from the aqueous phase 27 in a separating apparatus 26 and further used as fluid F and whereby at least a part of the aqueous phase 27 is removed from the separating apparatus (fluid C).

In the context of this invention the term "hydrophilic compounds" denotes at least partially water-soluble volatile and non-volatile compounds. Examples include inorganic salts and in particular residues of catalysts employed for the polymerization reaction like e.g. aluminum salts, iron or other transition metal salts or halides resulting from halogenation reactions and neutralizations.

Exemplary embodiments of step pre-a) are illustrated using FIGS. 8, 9, 10 and 11.

Figure 8:
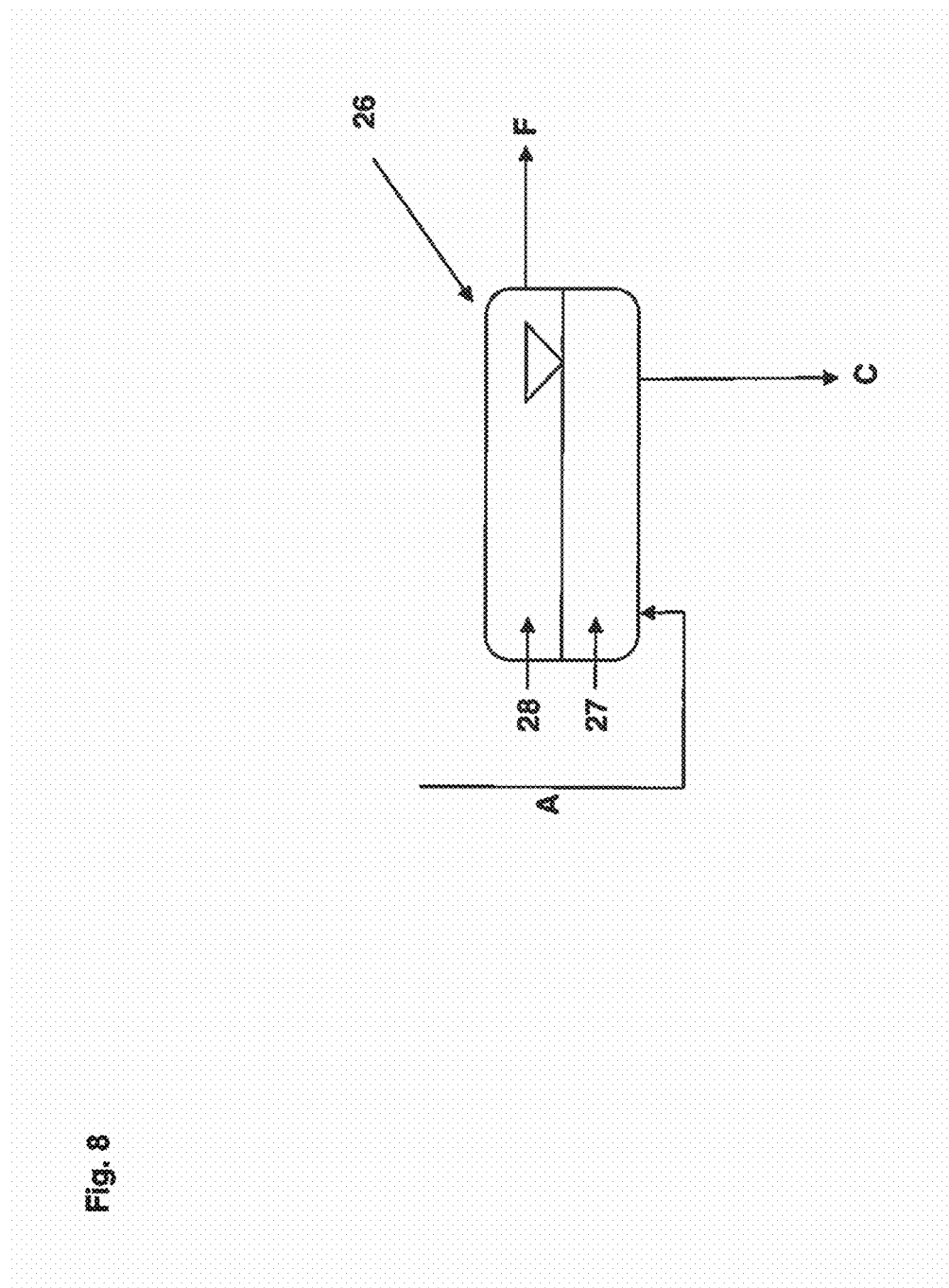
FIG. 8 shows a basic prewashing unit

A very basic and exemplary embodiment of the pre-washing step is shown in FIG. 8. In step pre-a) Fluid A containing at least one non-volatile polymer, at least one volatile compound and at least one hydrophilic compound is transferred to the separating apparatus 26, where it is mixed with water. Upon mixing with water an organic phase 28 and an aqueous phase 27 are obtained. The organic phase 28 is removed from the separating apparatus 26 and further used as fluid F, the aqueous phase 27 is at least partially removed from the separating apparatus 26 as fluid C, which is disposed of.

Figure 9:
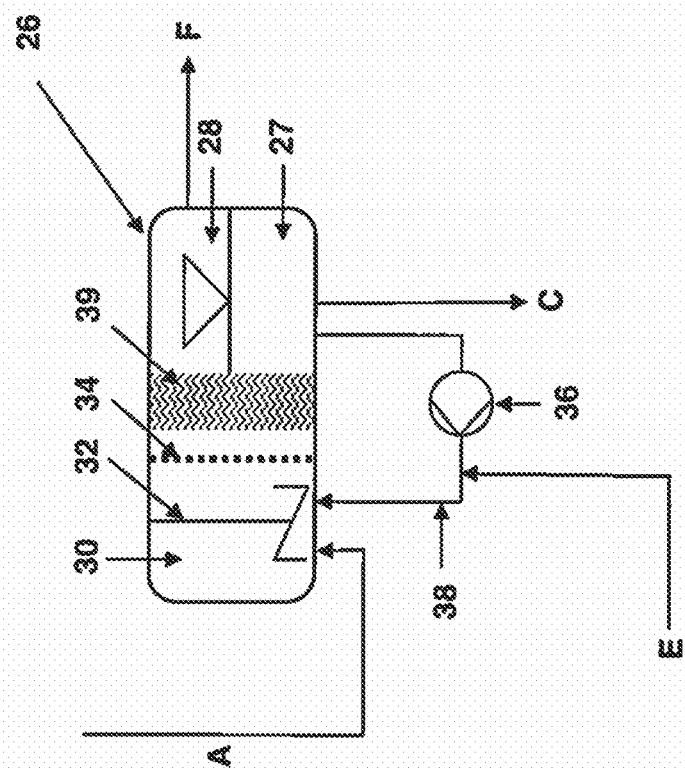
FIG. 9 shows a prewashing unit comprising a coalescer

An improved embodiment of the pre-washing step is shown in FIG. 9. In step pre-a) crude fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 39. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed and subjected to the subsequent process according to steps a) to c) as fluid F.

Generally, the coalescer in the pre-washing step is beneficial, but not mandatory. It helps to collect and coalesce the droplets and guides them to the phase interface which typically results in shorter residence times. Suitable examples of coalescers include structured or unstructured packings. Structured packings are for example flat plates, flat vanes, roof-shaped vanes and vanes with holes in vertical direction. The vanes or plates may be positioned rectangular or parallel to the main flow direction or with a slope. Unstructured packings are for example wire mesh, packings made of rings, spheres, cylinders, irregularly shaped geometries and weirs like distributor plates that have holes or slits, vertical plates covering a portion of the main flow path. The packings can be made of any technically feasible material, e.g. metals, glass, ceramic, coated metals, lined metals and polymeric materials like for example PTFE, ETFE, polyethylene (PE), polyetheretherketone (PEEK), Polypropylene (PP), polyamide (PA) and polyvinylidenfluoride (PVDF).

In a preferred embodiment of the invention step pre-a) is repeated at least once, preferably once.

Figure 10:
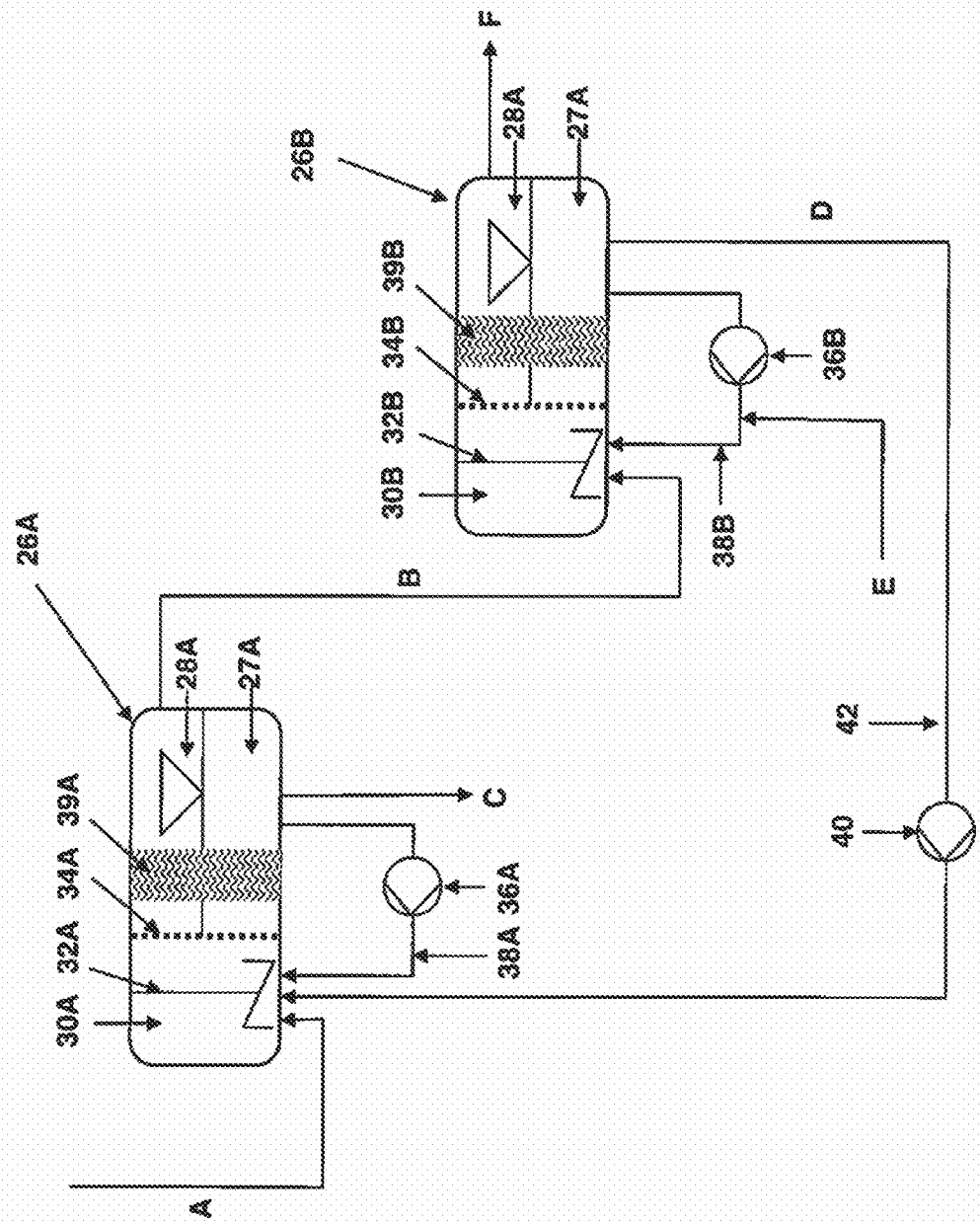
FIG. 10 shows a double-stage prewashing unit

A further improved and preferred embodiment of the pre-washing step is shown in FIG. 10. In step pre-a) of this double-stage prewashing step fluid A containing at least one non-volatile polymer, at least one volatile compound and at least one hydrophilic compound is fed to the mixing section 30A of a first separating apparatus 26A, which is equipped with a mixer 32A and passes through the separating wall 34A into a settling section, where the mixture separates into an aqueous phase 27A and an organic phase 28A, whereby the separation is supported by means of a coalescer 39A. A part of the aqueous phase 27A is removed from the separating apparatus 26A as fluid C, which is typically disposed of, with the rest being recycled via the recirculation line 38A by the action of recirculation pump 36A back into the mixing section 30A. The organic phase 28A is removed and fed as fluid B to the mixing section 30B of a second separating apparatus 26B, which is also equipped with a mixer 32B and passes through the separating wall 34B into a settling section, where the mixture separates into an aqueous phase 27B and an organic phase 28B, whereby the separation is supported by means of a coalescer 39B. A part of the aqueous phase 27B is recycled to the mixing section 30A of the first separating apparatus 26A as fluid D by the action of recirculation pump 40 and recirculation line 42, with the rest being enriched with fresh water E and recycled via the recirculation line 38B by the action of recirculation pump 36B back into the mixing section 30B of the second separating apparatus 26B. The organic phase 28 leaving the second separating apparatus 26B is subjected to the subsequent process according to steps a) to c) as fluid F. An advantage of this double-stage pre-washing step is that fluid F is substantially free of hydrophilic compounds and the amount of waste water is reduced due to recycling which results in higher concentration of hydrophilic compounds in fluid C.

In a preferred embodiment of the invention the separation is performed at temperatures of more than 40° C. The upper limit depends on the constitution of the polymer and the construction of the separating apparatus. Typically the upper limit is 125° C.

In a more preferred embodiment of the invention the separation is performed at temperatures of 40 to 110° C. preferably at temperatures of 80 to 110°.

Depending on the composition of fluid A and the boiling points of the components thereof, the separating apparatus may be designed to be operated under pressure.

Generally, the efficiency of the pre-washing step increases with increased temperature.

In another embodiment of the invention the organic phase 28 leaving the separating apparatus may be pre-heated to facilitate the free-flow of fluid F. This purpose can also be accomplished by a heater, whereby heat exchangers as disclosed for heater 2 above are preferred.

Figure 11:
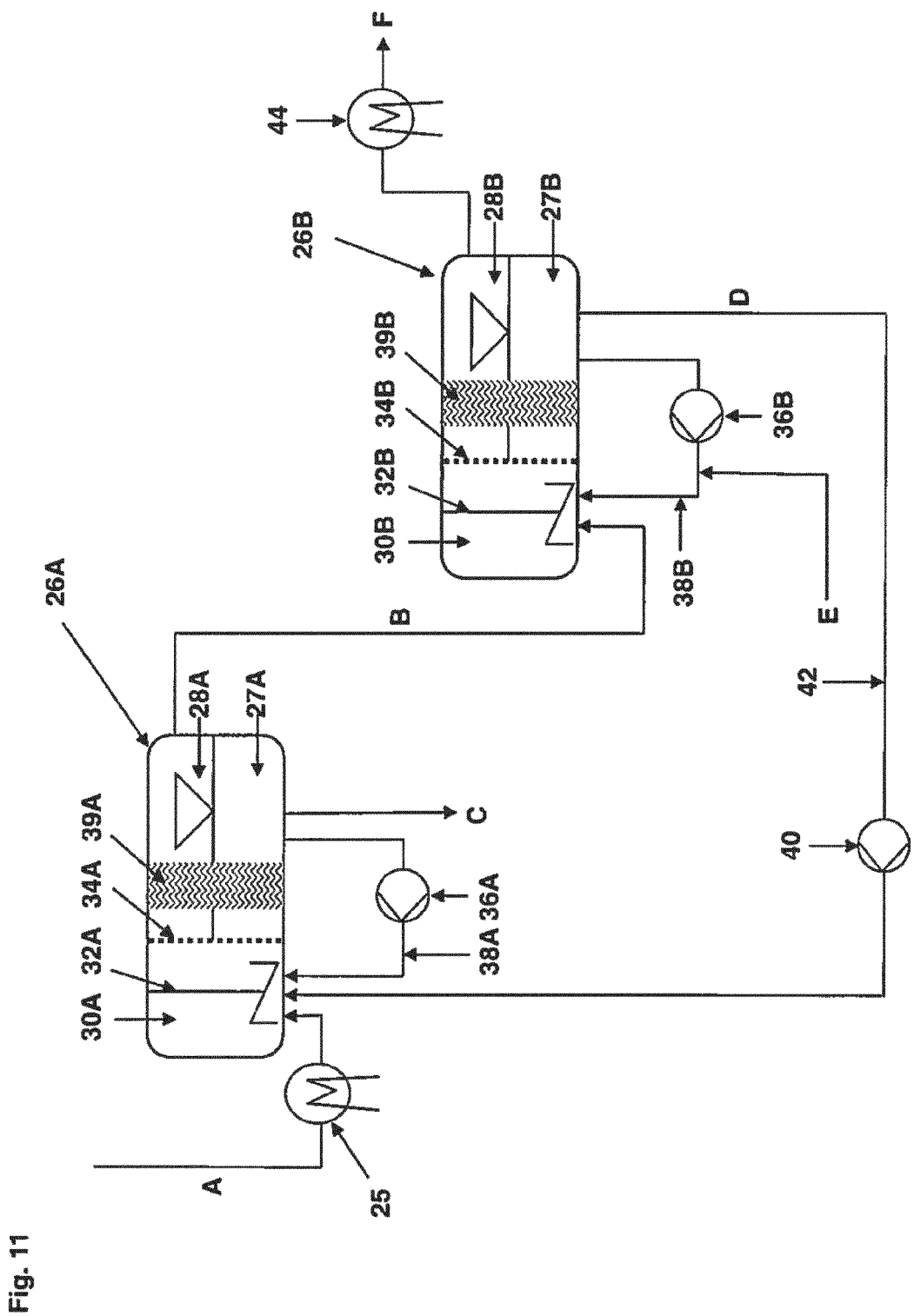
FIG. 11 shows a double-stage prewashing unit having additional heaters

A further improved and preferred embodiment having additional heaters for fluid A and fluid F is shown in FIG. 11 which is apart form the heaters identical to FIG. 10. Fluid A is heated before entering the separating apparatus by heater 25, the organic phase 28 leaving the second separating apparatus 26B is heated by heater 44.

The performance of Step pre-a) is particularly advantageous for fluids F containing halobutyl rubbers, and in particular for chlorobutyl and bromobutyl rubbers, since crude halobutyl rubber solutions often contain high amounts of inorganic halides resulting from the halogenation of the polymer.

For example, a fluid A stemming from the bromination of butyl rubber typically contains inorganic bromide levels of 3,000 to 5,000 ppm calculated on the mass of bromobutyl rubber. Upon performance of step pre-a) this level can be reduced to less than 500 ppm, preferably to less than 300 ppm and even more preferably to less than 100 ppm.

For example, a fluid A stemming from the chlorination of butyl rubber typically contains inorganic chloride levels of 1,000 to 5,000 ppm calculated on the mass of chlorobutyl rubber. Upon performance of step pre-a) this level can be reduced to less than 500 ppm, preferably to less than 300 ppm and even more preferably to less than 100 ppm.

It was further found that the performance of step pre-a) allows to significantly reduce the water content of fluid F compared to fluid A, which contributes to a significantly lower energy consumption for the subsequent steps a) to c).

Figure 7:
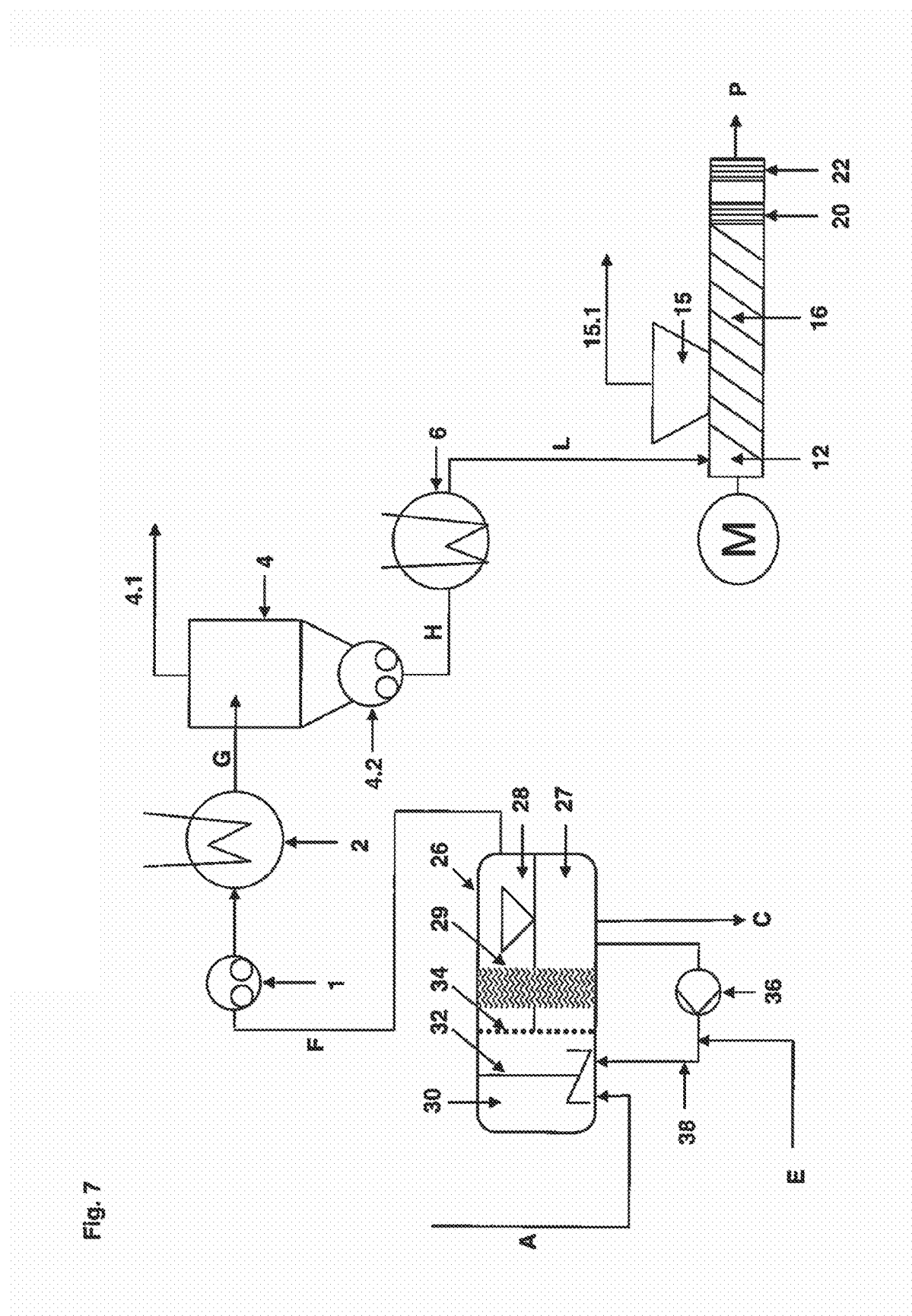
FIG. 7 shows a single-stage prewashing unit, a single-stage concentrator unit, a reheating unit and an extruder unit comprising one extruder degassing section, one accumulating section and one outlet section.

One further embodiment of the invention is shown in FIG. 7. FIG. 7 shows a basic flow chart and suitable device for the accomplishment of the process comprising the steps pre-a) and a) to c).

In step pre-a) fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 39. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed as fluid F. In step a) Fluid F is transferred via pump 1 to the heater 2, whereby heated fluid G is obtained. Heated fluid G is fed into the degassing vessel 4. The vapors emerging from the heated fluid G are separated and removed by a vacuum line 4.1. After degassing and separation a concentrated fluid H is obtained, which is removed from the degassing vessel 4 by means of a pump 4.2.

In step b), the concentrated fluid H obtained in step a) is then passed through a reheating unit 6 to obtain a reheated concentrated fluid L. In step c), the reheated concentrated fluid L obtained in step b) is passed on to a extruder unit and fed into the conveying section 16 of the extruder at the feeding point 12. The conveying section 16 is open to a vent port 15. In the conveying section 16 a part of the solvent is evaporated and separated from the reheated concentrated fluid L. The vapors are removed through the vent port 15 via vapor line 15.1. The conveying section 16 is terminated by a accumulating section 20. While passing from the conveying section 16 and the accumulating section 20 to the outlet section 22 the reheated concentrated fluid L undergoes a transition from the preferably free-flowing reheated concentrated fluid L to the product P.

It was further found that the overall energy consumption for the preparation of halogenated butyl rubbers can be significantly reduced if fluid A or Fluid F, preferably fluid A is prepared by a process comprising at least the steps of I) providing a reaction medium comprising
   a common aliphatic medium comprising at least 50 wt.-% of one or more aliphatic hydrocarbons having a boiling point in the range of 45° C. to 80° C. at a pressure of 1013 hPa, and
   a monomer mixture comprising at least one isoolefin monomer, at least one multiolefin monomer and either no or at least one other co-polymerizable monomer in a mass ratio of monomer mixture to common aliphatic medium of from 40:60 to 99:1, preferably from 50:50 to 85:15 and even more preferably from 61:39 to 80:20;

II) polymerizing the monomer mixture within the reaction medium to form a rubber solution comprising a rubber polymer which is at least substantially dissolved in the medium comprising the common aliphatic medium and residual monomers of the monomer mixture;

III) separating residual monomers of the monomer mixture from the rubber solution to form a separated rubber solution comprising the rubber and the common aliphatic medium, IV) halogenating the rubber in the separated rubber solution using a halogenating agent which is in case of a brominating agent optionally at least partially regenerated by an oxidizing agent.

As used herein the term "at least substantially dissolved" means that at least 70 wt.-%, preferably at least 80 wt-%, more preferably at least 90 wt.-% and even more preferably at least 95 wt.-% of the rubber polymer obtained according to step II) are dissolved in the medium.

In an embodiment of the invention the polymerization according to step II) and the provision of a solution according to step I) is effected using a solution polymerization reactor. Suitable reactors are those known to the skilled in the art and include commonly known flow-through polymerization reactors.

Step III) of the process may employ distillation to separate un-reacted residual monomers, i.e. the isoolefin monomers and the multiolefin monomers from the medium. This mitigates the formation of undesirable halogenation byproducts from the unreacted monomers. The process is conducted at a moderate or relatively high ratio of monomers to the common aliphatic medium. Typically, the isoolefin monomers have a significantly lower viscosity than the common aliphatic medium and therefore, a higher monomer level results in a lower overall viscosity. Overall energy efficiency and raw material utilization of the process is improved by eliminating the need to separate the rubber from a first diluent or solvent used for polymerization, then re-dissolve it in a second solvent for bromination and by recycling bromides resulting from bromination back to a brominating agent. The integrated process according to the invention therefore provides improved energy and raw material efficiency and a reduction in the number of process steps as compared with conventional non-integrated processes for making halogenated rubbers, in particular bromobutyl rubbers.

In an embodiment of the invention the bromination according to step IV) is performed in a continuous process, for example using a commonly known flow-through halogenation reactor.

Preferred embodiments of the steps I to IV are exemplarily described with reference to FIG. 12 which shows a process flow diagram for a process according to the present invention that employs purification and optional recycle of un-reacted monomers following separation thereof from the polymer solution.

Referring to FIG. 12, a solution polymerization reactor 400 is provided with a feed of monomers FM, comprising isoprene and isobutylene, and a feed of the common aliphatic medium S via an optional heat exchanger 100, preferably a recuperative heat exchanger, and feed cooler 200. The monomers may either be pre-mixed with the common aliphatic medium or mixed within the polymerization reactor 400. A catalyst solution, comprising a carbocationic initiator-activator system of the type used for butyl rubber polymerizations (e.g. a trivalent metal species, such as aluminum, and a small amount of water), is pre-mixed with the common aliphatic medium S in a catalyst preparation unit 300 and also introduced to the reactor 400. The solution polymerization is then allowed to occur within the polymerization reactor 400. Solution polymerization reactors 400 of a type suitable for use in the present integrated process, along with process control and operating parameters of such reactors, are described, for example, in EP 0 053 585 A, which is herein incorporated by reference. Conversion is allowed to proceed to the desired extent and then a reaction stopping agent Q, for example water or an alcohol such as methanol, is added and mixed into the reactor discharge stream comprising the common aliphatic medium S, un-reacted monomers FM and butyl rubber IIR in mixer 500. The resulting polymer solution comprising un-reacted monomers FM i.e. isoprene and isobutylene, the common aliphatic medium S and butyl rubber IIR is passed through a recuperative heat exchanger 100 where it is warmed by the incoming feeds to the reactor, while at the same time helping to cool these feeds before they enter the final feeds cooler 200. The warmed polymer solution is then directed to a distillation column 600 for removal of the un-reacted monomers. Once the un-reacted monomers have been separated as recycling stream $FM_R$, they exit from the top of the column 600 and the separated polymer solution (S, IIR) exits from the bottom of the column 600 to a solution halogenation reactor 700. Additional common aliphatic medium S and/or water w may be provided to the bromination reactor 700 in order to provide the desired conditions for bromination. It is important to note that the same common aliphatic medium used for polymerization accompanies the butyl rubber through the process to halogenation and that there is no need to separate the polymer from the solvent prior to halogenation. A feed of a halogenation agent HAL and optionally in case the halogenating agent HAL is a brominating agent optionally an oxidizing agent OX (as described hereinafter) is also provided to the halogenation reactor 700. The halogenated butyl rubber (HIIR) exits the reactor in solution (S, HIIR) and is then finished using finishing equipment 800, as herein described above and in FIGS. 1 to 11. The common aliphatic medium removed during the finishing step is sent as recycling stream $S_R$ to solvent recovery 1100 prior to introduction to solvent purification section 1200. Additional common aliphatic medium $S_F$ may be added before purification 1200 or afterwards, if the medium has already been pre-purified. The purified common aliphatic medium is recycled back to the recuperative heat exchanger 100 and final feed cooler 200 for re-use in the process. The un-reacted monomers separated from the polymer solution in the distillation column 600 are sent as recycle stream $FM_R$ to monomer recovery unit 900 and are then purified in monomer purification section 1000 prior to being recycled back to the recuperative heat exchanger 100 and feed cooler 200. Additional fresh monomers $M_F$ may be added either prior to monomer purification 100 or afterwards, if the monomers have been pre-purified. The use of a common aliphatic medium for both polymerization and halogenation reduces environmental impact and improves economic performance of the integrated process as compared with conventional approaches.

The description of the process given hereinabove is exemplary and can be applied to all common aliphatic media compositions as well as to all monomer and product compositions mentioned herein.

It is within the scope of the present invention that the composition of the common aliphatic medium may have a slightly varying composition before and after removal of the un-reacted monomers due to different boiling points of its components.

The monomer mixture used to produce the butyl rubber, by solution polymerization is not limited to a specific isoolefin or a specific multiolefin or to specific other co-polymerizable monomers, provided that the individual monomers have boiling points lower than the aliphatic hydrocarbons of the common aliphatic medium which are selected from those aliphatic hydrocarbons having a boiling point in the range of 45° C. to 80° C. at a pressure of 1013 hPa. It is clear that the boiling point of the monomers may be higher than 45° C. at a pressure of 1013 hPa, if the aliphatic hydrocarbons of the common aliphatic medium are selected in such a way that their boiling point is higher than that of the highest boiling component of the monomer mixture but still below 80° C. at a pressure of 1013 hPa.

Preferably, the individual monomers have boiling points lower than 45° C. at 1013 h Pa, preferably lower than 40° C. at 1013 hPa.

Preferred isoolefins are iso-butene, 2-methyl-1-butene, 3-methyl-1-butene, 2-methyl-2-butene or mixtures thereof. The most preferred isoolefin is isobutene.

Preferred multiolefins are isoprene, butadiene or mixtures thereof. The most preferred multiolefin is isoprene.

In one embodiment, the monomer mixture may comprise in the range of from 80.0% to 99.9% by weight, preferably in the range of from 92.0% to 99.5% by weight of at least one, preferably one isoolefin monomer and in the range of from 0.1% to 20.0% by weight, preferably 0.5% to 8.0% by weight of at least one, preferably one multiolefin monomer. More preferably, the monomer mixture comprises in the range of from 95.0% to 98.5% by weight of at least one, preferably one isoolefin monomer and in the range of from 1.5% to 5.0% by weight of at least one, preferably one multiolefin monomer. Most preferably, the monomer mixture comprises in the range of from 97.0% to 98.5% by weight of at least one, preferably one isoolefin monomer and in the range of from 1.5% to 3.0% by weight of at least one, preferably one multiolefin monomer.

In a preferred embodiment of the invention the ranges given above apply to monomer mixtures wherein the isoolefin is isobutene and the multiolefin is isoprene.

In one embodiment, the multiolefin content of butyl rubbers produced according to the invention is for example in the range of 0.1 mol % to 20.0 mol %, preferably in the range of 0.5 mol % to 8.0 mol %, more preferably in the range of 1.0 mol % to 5.0 mol %, yet more preferably in the range of 1.5 mol % to 5 mol % and even more preferably in the range of 1.8 mol % to 2.2 mol %.

One of the ways in which the aforementioned viscosity problems have been overcome is by selecting a high ratio of monomers to solvent in the polymerization step. Although mass ratios of up to 60:40 monomers to aliphatic hydrocarbon solvent have been used in the prior art, in one aspect the present invention utilizes higher ratios, for example from 61:39 to 80.20, preferably from 65:35 to 70:30. The presence of higher monomer levels, which are predominantly C4 compounds and have lower viscosity than the common aliphatic medium, reduces the solution viscosity to tolerable limits and also permits a higher solids level to be achieved during polymerization. Use of higher monomer levels also allows an acceptable molecular weight to be reached at a higher temperature than when lower levels of monomer are employed. The use of higher temperature in turn reduces solution viscosity and permits greater polymer solids level in the solution.

Another one of the ways in which the aforementioned viscosity problems have been overcome is by selecting the common aliphatic medium as a solvent. A solvent having a higher content or consisting of compounds having a boiling point of less than 45° C. or less at 1013 hPa would have a boiling point such close to the monomers that their separation from the solution would also result in significant solvent removal.

The use of a solvent having a higher content or consisting of compounds having a boiling point of more than 80° C. at 1013 hPa would cause difficulties in the separation from the rubber after halogenation. The solution viscosity provided by use of such solvents is also significantly higher than with the common aliphatic medium, making the solution more difficult to handle and impeding heat transfer in the reactor, even when provided with the high monomer to solvent ratios described above.

In a preferred embodiment of the invention the common aliphatic medium comprises at least 80 wt.-% of one or more aliphatic hydrocarbons having a boiling point in the range of 45° C. to 80° C. at a pressure of 1013 hPa, preferably at least 90 wt.-%, even more preferably at least 95 wt.-% and yet even more preferably at least 97 wt.-%. Aliphatic hydrocarbons having a boiling point in the range of 45° C. to 80° C. at a pressure of 1013 hPa include cyclopentane, 2,2-dimethylbotane, 2,3-dimethylbutane, 2-methylpentane, 3-methylpentane, n-hexane, methylcyclopentane and 2,2-dimethylpentane.

The common aliphatic medium may, for example further comprise other compounds which are at least substantially inert under polymerization conditions such as other aliphatic hydrocarbons like for example heptanes and octanes having a boiling point of more than 80° C. at a pressure of 1013 hPa, propanes, butanes, pentanes, cyclohexane as well as halohydrocarbons such as methylchloride and other chlorinated aliphatic hydrocarbons which are at least substantially inert under reaction conditions as well as hydrofluorocarbons whereby hydrofluorocarbons are for example those represented by the formula: $C_xH_yF_z$ wherein x is an integer from 1 to 20, alternatively from 1 to preferably from 1 to 3, wherein y and z are integers and at least one.

In another preferred embodiment of the invention the common aliphatic medium is substantially free of halohydrocarbons.

In another embodiment of the invention the common aliphatic medium has a content of cyclic aliphatic hydrocarbons of less than 25 wt.-%, preferably less than 20 wt.-%.

In another embodiment of the invention the common aliphatic medium has a content of cyclohexane (boiling point: 80.9° C. at 1013 hPa) of less than 5 wt.-%, preferably less than 2.5 wt.-%.

As used hereinbefore the term "substantially free of halohydrocarbons" means a content of halohydrocarbons within the common aliphatic medium of less than 2 wt.-%, preferably less than 1 wt.-%, more preferably less than 0.1 wt.-% and even more preferably absence of halohydrocarbons.

The preferred ratio of monomers to a hydrocarbon solvent is not calculable in advance, but may be easily determined by very few routine experiments. Although increasing the amount of monomers should reduce solution viscosity, making accurate theoretical predictions of the extent of that reduction is not feasible due in part to the complex effect on viscosity of the interaction of various components of the solution at the concentrations and temperatures employed in the process.

In one embodiment, the process temperature of step II) is in the range of −100° C. to −40° C., preferably in the range of −95° C. to −65° C., more preferably in the range of −85° C. to −75° C., yet more preferably in the range of −80° C. to −75° C.

Although higher temperatures are desirable in that energy usage for refrigeration and pumping (due to lower viscosity at higher temperature) are reduced, this generally leads to lower molecular weight polymers that are not as commercially desirable. However, due to the use of high monomer to solvent ratios in the present invention, a reduced but still acceptable molecular weight can be obtained with higher temperatures.

Therefore, in an alternative embodiment, temperatures in the range of −50° C. to lower than −75° C., preferably −55° C. to −72° C., more preferably −59° C. to −70° C., yet more preferably −61° C. to −69° C., are used while still obtaining the desired molecular weight of butyl rubber.

The viscosity of the solution at the discharge of reactor 40 is typically and preferably less than 2000 cP, preferably less than 1500 cP, more preferably less than 1000 cP. A most preferred range of viscosity is from 500 to 1000 cP.

The solids content of the solution obtained following polymerization is preferably in the range of from 3 to 25%, more preferably 10 to 20%, even more preferably from 12 to 18%, yet more preferably from 14 to 18%, even more preferably from 14.5 to 18%, still more preferably 15 to 18%, most preferably 16 to 18% by weight. As described previously, higher solids contents are preferred, but entail increased solution viscosity. The higher monomer to solvent ratios used in the present process allow higher solids contents to be achieved than in the past and advantageously also permit use of a common aliphatic medium for both polymerization and bromination.

As used herein the term "solids content" refers to weight percent of the polymer obtained according to step II) i.e. in polymerization and present in the rubber solution.

In step III), un-reacted residual monomers are removed from the solution following polymerization preferably using a distillation process. Distillation processes to separate liquids of different boiling points are well known in the art and are described in, for example, the Encyclopedia of Chemical Technology, Kirk Othmer, 4th Edition, pp. 8-311, which is incorporated herein by reference.

The degree of separation is largely dependent upon the number of trays used in the column. An acceptable and preferred level of residual monomers in the solution following separation is less than 20 parts per million by weight. About 40 trays have been found sufficient to achieve this degree of separation. Separation of the common aliphatic medium from the monomers is not as critical and contents of for example up to 10 wt.-% of components of the common aliphatic medium are acceptable in the overhead stream from the distillation process. In a preferred embodiment the contents of components of the common aliphatic medium in the overhead stream from the distillation process are less than 5 wt.-%, more preferably less than 1 wt.-%.

With reference to FIG. 12, the process of the present invention preferably includes purification of the un-reacted monomers separated from the polymerization solution using the distillation column 600. A purification unit 1000 may be provided for this purpose; alternatively, purification can take place offsite in a separate purification unit. The purified monomers are normally recycled back into the process and mixed with fresh monomers; however, they may alternatively be utilized in a different process or sold separately. Preferred embodiments of the process include these optional purification and recycling steps in order to achieve advantageous overall process economics.

Purification of monomers may be carried out by passing through adsorbent columns containing suitable molecular sieves or alumina based adsorbent materials. In order to minimize interference with the polymerization reaction, the total concentration of water and substances such as alcohols and other organic oxygenates that act as poisons to the reaction are preferably reduced to less than around 10 parts per million on a weight basis. The proportion of monomers that are available for recycle depends on the degree of conversion obtained during the polymerization process. For example, taking a ratio of monomer to common aliphatic medium of 66:34, if the solids level in the rubber solution produced is 10%, then 85% of the monomers are available to be returned in the recycle stream. If the solids level is increased to 18%, then 73% of the monomers are available for recycle.

Following removal of the un-reacted residual monomers, the butyl polymer is halogenated In step IV). The bromobutyl rubber is produced using solution phase techniques. The separated rubber solution comprising the rubber and the common aliphatic medium, hereinafter also referred to as "cement" is treated with a halogenating agent and as far as the halogenating agent is a brominating agent optionally is at least partially regenerated by an oxidizing agent.

Supplemental solvent, for example comprising fresh common aliphatic medium, and/or water may be added to the separated rubber solution in order to form a cement having the desired properties for halogenation.

Halogenation in the common aliphatic medium used during the polymerization step advantageously saves energy as compared with the conventional slurry process by eliminating the need for separating the polymer from the polymerization medium, then re-dissolving it in a different medium for halogenation.

Preferably, the amount of halogenating agent is in the range of from 0.1 to 20%, preferably from 0.1 to 8%, more preferably from 0.5% to 4%, even more preferably from 0.8% to 3%, yet even more preferably from 1.2 to 2.5%, even still more preferably from about 1.5% to about 2.5% and most preferably from 1.5 to 2.5% by weight of the rubber.

In another embodiment the quantity of halogenating agent is 0.2 to 1.2 times the molar quantity of double bonds contained in the rubber, preferably the butyl rubber, preferably 0.3 to 0.8, more preferably 0.4 to 0.6 times the molar quantity.

Halogenating agents are for example chlorine and bromination agents. Suitable bromination agent comprise elemental bromine ($Br_2$), interhalogens such as bromine chloride (BrCl) and/or organo-halide precursors thereto, for example dibromo-dimethyl hydantoin, N-bromosuccinimide, or the like. The most preferred brominating agent is molecular bromine ($Br_2$).

Where the reaction is conducted with the oxidizing agent present at the onset of the bromination reaction, hydrogen bromide may be used as the bromine source. The preferred bromine source is molecular bromine ($Br_2$).

The oxidizing agents which have been found suitable for the intended purposes of are water soluble materials which contain oxygen. Preferred oxidizing agents are selected from the group consisting peroxides and peroxide forming substances as exemplified by the following substances: hydrogen peroxide, sodium chlorate, sodium bromate, sodium hypochlorite or bromite, oxygen, oxides of nitrogen, ozone, urea peroxidate, acids such as pertitanic perzirconic, perchromic, permolybdic, pertungstic, perboric, perphosphoric, perpyrophosphoric, persulfates, perchloric, perchlorate and periodic acids and mixtures of the aforementioned compounds.

Such oxidizing agents may either be used in combination with surfactants or not. In a preferred embodiment no surfactants are added.

Suitable surfactants are for example $C_6$-$C_{24}$-alkyl- or $C_6$-$C_{14}$-aryl-sulfonic acid salts, fatty alcohols and ethoxylated fatty alcohols and the like materials.

Preferred oxidizing agents are hydrogen peroxide and hydrogen peroxide-forming compounds, such as per-acids and sodium peroxide, whereby hydrogen peroxide is even more preferred.

For safety reasons, hydrogen peroxide is preferably applied in form of its aqueous solutions, in particular its aqueous solutions comprising 25 to 50 wt.-%, preferably 28 to 35 wt.-%, more preferably around 30 wt.-% of hydrogen peroxide.

It was found that the lower the water content in the cement is, the better the bromine utilization and oxidation performance with hydrogen peroxide is.

The weight ratio of hydrogen peroxide to water within the reaction mixture is therefore preferably below 1:100, even more preferably below 1:50, and yet more preferably below 1:10. In one embodiment of the invention, the total amount of water present in the reaction will be provided by the addition of the hydrogen peroxide solution.

The amount of oxidizing agent used depends on the amount and kind of brominating agent used. For example from 0.2 to about 5 mol of oxidizing agent per mol of brominating agent may be used, preferably from 0.5 to 3 mol and more preferably from 0.8 to 1.2 mol.

The oxidizing agent may be introduced into the reaction zone at the onset of the bromination reaction, it may be added prior to, concurrently with or subsequent to the addition of the brominating agent.

In a preferred embodiment the oxidizing agent is added prior to the brominating agent to allow its dispersal throughout the reaction medium the oxidizing agent is added concurrently or before the brominating agent.

In another embodiment the oxidizing agent is not added to the reaction mixture until after at least about 50% of the brominating agent has been consumed in the bromination reaction.

Generally, the halogenation process may be operated at a temperature of from 0° C. to 90° C., preferably from 20° C. to 80° C. and the reaction time may for example be from 1 minute to 1 hour, preferably from 1 to 30 minutes. The pressure in the halogenation reactor may be from 0.8 to 10 bar.

The amount of halogenation during this procedure may be controlled so that the final polymer has the preferred amounts of bromine described hereinabove. The specific mode of attaching the halogen to the polymer is not particularly restricted and those of skill in the art will recognize that modes other than those described above may be used while achieving the benefits of the invention. For additional details and alternative embodiments of solution phase halogenation processes, see, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300, which are incorporated herein by reference.

After completion of the halogenation reaction, the polymer may be recovered by conventional methods, e.g., neutralization with dilute caustic, water washing and removal of solvent such as by steam stripping or precipitation using a lower alcohol such as isopropanol, followed by drying or preferably as disclosed hereinabove and in FIGS. 8 to 11.

The invention is in particular advantageous in view of energy and fresh water consumption. The products obtained are free of volatile compounds.

EXAMPLES

Analytical Methods

Water content of fluids F: The sample was put into a centrifuge and spun for 5 min at 4000 rpm at room temperature. The water was then collected at the bottom of the vial and weighed.

Total volatiles concentration: A rubber sample was cut into small pieces of 2×2 mm size. Roughly 30 g of rubber pieces were put in an alumina crucible. The weight of the crucible and the rubber was determined. The crucible including the rubber sample was then placed in a vacuum oven at a vacuum level of 130 hPa for 60 min at a temperature of 105° C. After drying, the crucible was placed in an exsiccator and let cool down for 30 min. The crucible was then weighed again. The loss in weight was determined.

Residual solvent concentration in product P: The residual solvent concentration in the product was determined by headspace gas chromatography. A weighed portion (0.5+−0.005 g) of sample was placed in a headspace vial, and a measured amount of solvent (1,2 dichlorobenzene, ODCB) was added. The vial was sealed and shaken until the rubber was dissolved. The vial was heated until the volatile organic compounds were distributed at equilibrium between the sample and the gas phase in the vial (headspace). An aliquot of the headspace gas was injected into a stream of carrier gas, which carries the sample along a chromatographic column. Standards of known composition were used to calibrate the GC. Toluene was added to the solvent for use as an Internal Standard.

Residual water concentration in product P: The total volatiles concentration is the sum of water, solvents and monomers. As the monomer concentration is usually less then 0.0005 wt %, the water content can be determined by subtracting the solvent concentration from the total volatiles concentration.

Solvent concentration in fluids: The concentration of solvents in fluids were measured using gas chromatography. The internal standard was isooctane. The sample was diluted with toluene and then injected into the gas chromatograph. The gas chromatography was performed on a HP 6890 chromatograph, with following specifications:

column type DB-5 of J&W, length 60 m, diameter 0.23 mm, film thickness 1.0 μm
    injector temp.: 250° C.
    detector temp.: 350° C.
    carrier gas: Helium
    column pressure: 96 kPa
    detector: FID Viscosity of fluids: The viscosity was measured in a rotational rheometer of cone-plate type. All given viscosities refer to the extrapolated zero shear viscosity.

Example 1—Polymerization and Distillation

Key elements of the process described in FIG. 13 have been operated at pilot scale with reactors of 20 liter total capacity running in a continuous mode. Feeds to the reactors were 38.7 kg/h of isobutene, 0.9 kg/h of isoprene and 20.0 kg/h of hexane giving a monomer/hexane mass ratio of 66:34. The reaction temperature used was −65° C. and a solution having a solids content of 16 wt % was produced. This material had a weight average molecular weight of about 440 kg/mol and an isoprene content of about 1.7 mol-%. The solution from the reactors was fed to a distillation column with 40 trays and separation of the monomers from the rubber solution was performed. The solution was preheated to 42° C. and a re-boiler was used at the bottom of the column to maintain a bottom temperature of 113° C. A reflux condenser was used to return part of the overhead stream to the top of the column maintaining a temperature there of 36° C. The separation achieved in the column left less than 10 ppm of residual isoprene monomer in the separated rubber solution and 1.2% of hexane in the overhead monomer stream. The separated monomers were purified, then re-introduced to the solution polymerization reactor. The separated rubber solution in the hexane solvent was such that bromination could be accomplished by conventional means with addition of supplemental hexane solvent.

Example 2—Halogenation

The separated rubber solution of Example 1 was halogenated using a continuous pilot scale bromination equipment. Supplemental solvent in an amount of 10% was added to the separated rubber solution in order to lower the viscosity. To simulate plant conditions, supplemental water was added to the solution and allowed to disperse throughout the reaction medium. 30 wt.-% hydrogen peroxide in water (at a molar ratio of 1:1 with bromine to be added) was introduced into this solution and the resulting mixture was agitated at 50° C. for up to 2 minutes prior to the addition of bromine. The amount of bromine added was 24 kg per ton of base rubber (=65% of standard, non-recovery bromination amount). After a reaction period of up to 30 minutes, caustic solution was added to the reaction mixture to neutralize any residual hydrogen bromide, bromine and hydrogen peroxide. The neutralized cement was used for example 3 as fluid (A).

Example 3: Pre-Washing

The crude bromobutyl rubber solution, hereinafter denoted as fluid (A) contained two phases: an aqueous phase (56 wt %) and an organic phase (44 wt %). The overall ratio of bromobutyl rubber with respect to hexanes in the organic phase alone was constant throughout the examples, being 22 wt % bromobutyl rubber and about 78 wt % hexanes. The bromobutyl rubber, contained in fluid (A) had the following properties, once finished and dried: Mooney (ML 1+8, 125° C.) of 32±4, bound bromine content 1.8±0.2 wt %.

Fluid (A) further comprised certain additives, the concentration being given as mass fraction with respect to the rubber mass (phr=parts per hundred parts of rubber):

ESBO: 1 to 1.6 phr, calcium stearate 1.3 to 1.7 phr, Irganox 0.03 to 0.1 phr

The aqueous phase had a typical pH-value of 9.5. In addition to the additives, fluid (A) comprised inorganic components like bromides, chlorides, calcium, sodium, aluminum and small amounts of other inorganic components.

The experiment was carried out using a glass vessel having a volume of 1l and performed batchwise. The vessel was equipped with a stirrer.

The water content in the organic phase was determined as described above.

A sample of fluid (A) was taken and left settling. The aqueous phase and the organic phase were analyzed. The aqueous phase contained 4940 mg/l of inorganic bromides.

The organic phase contained 20 wt % bromobutyl rubber, 68 wt % hexane and 12 wt % water. The total inorganic bromine concentration in the organic phase was 0.15 wt % (1500 ppm).

Examples 4 to 23: Concentration and Direct Evaporation

The fluid (F) containing butyl rubber used as a feedstock for examples 4 to 23 was obtained from two different sources:

Preparation of Fluid F1

A crude butyl rubber solution was taken from a commercial production plant, allowed to settle several hours and the organic phase separated from the bulk aqueous phase. The organic phase was then used to perform the experiments as fluid (F1). Fluid (F1) contained 20 wt % rubber, 70 wt % hexanes and 10 wt % water calculated on 100 wt % of these three components and was thus very similar to the organic phase obtained in example 3. The concentration of additives with respect to the bromobutyl rubber fraction was:

ESBO: 1 to 1.6 phr, Calcium stearate: 1.3 to 1.7 phr and Irganox: 0.03 to 0.1 phr The bromobutyl rubber, dissolved in the fluid (F1), had the following properties, once finished and dried: Mooney (ML 1+8, 125° C.) of 28 to 36, Bound bromine content of 1.6 to 2.0 wt %.

The viscosity of Fluid F1 at 60° C. was 1,760 mPa*s

Preparation of Fluid F2

Commercially available bromobutyl rubber with a Mooney (ML 1+8, 125° C.) of 28 to 36, a bromine content of 1.6 to 2.0 wt % and an organic volatile concentration of <0.7 wt % was dissolved in technical hexane whereby a fluid (F2) was obtained containing 20 wt % rubber, 79 wt % hexanes and 1 wt % water calculated on 100 wt % of these three components. Therefore also fluid F2 was very similar to the organic phase obtained in example 3. The concentration of additives with respect to the bromobutyl rubber fraction was:

ESBO: 1 to 1.6 phr, Calcium stearate 1.3 to 1.7 phr and Irganox: 0.03 to 0.1 phr Examples 4 to 8: Concentration The Concentrator Unit The concentrator unit used for the examples was similar to the one shown in FIG. 1. A piston pump was used to pump the fluid F1, which was prepared as described above, to heater (2). The heater (2) was a single tube-in-tube type heat exchanger. The internal pipe was equipped with a static mixer of Kenics type, the diameter of the internal pipe was 15 mm. The tube was heated by a tube shaped shell. The heating medium was heating oil (Marlotherm). A pressure relief valve (3) was installed prior to the degassing vessel (4), the pressure upstream of the valve was controlled automatically to a set point value. This set point was chosen so that boiling in the heated fluid (GI) was prevented. The heated fluid (G) was introduced into the degassing vessel (4) from the top. The conical outlet of the degassing vessel (4) was equipped with a pump (4.2), which was a combination of an extruder type pump and a gear pump. This combination had the advantage of being able to handle high viscosities and to build up high pressures. Samples were taken from the concentrated fluid (H) to investigate the concentration and viscosity after the concentration stage.

Example 4

The heating medium of the heater 2 was set to 125° C., the pressure in the separating vessel 4 was atmospheric (1013 hPa). The concentrated fluid H in the bottom of the separating vessel 4 was a free flowing foamy liquid, as observed through a sight glass and could be easily conveyed from the separating vessel using the extraction pump 4.2 as described above. The concentrated fluid H had a hexane concentration of 71 wt % and a viscosity of 4,840 mPa*s measured at 60° C.

Example 5

The feedstock, fluid F1, and the concentration unit were the same as in example 8. The heating medium of the heater 2 was set to 155° C., the pressure in the separating vessel 4 was atmospheric (1013 hPa). The concentrated fluid H in the bottom of the separating vessel 4 was a free flowing foamy liquid, as observed through a sight glass and could be easily conveyed from the separating vessel using the extraction pump 4.2 as described above. The concentrated fluid H had a hexane concentration of 53 wt % and a viscosity of 65,000 mPa*s measured at 60° C.

Example 6

The feedstock, fluid F1, and the concentration unit were the same as in example 8. The heating medium of the heater 2 was set to 170° C., the pressure in the separating vessel 4 was atmospheric (1013 hPa). The concentrated fluid H in the bottom of the separating vessel 4 was a free flowing foamy liquid, as observed through a sight glass and could be conveyed from the separating vessel without plugging or product buildup using the extraction pump 4.2 as described above. The concentrated fluid H had a hexane concentration of 42 wt % and a viscosity of 317,700 mPa*s measured at 60° C.

Example 7

The feedstock, fluid F1, and the concentration unit were the same as in example 8. The heating medium of the heater 2 was set to 170° C., the pressure in the separating vessel 4 was 500 hPa. The concentrated fluid H in the bottom of the separating vessel 4 was a free flowing foamy liquid, as observed through a sight glass and could be conveyed from the separating vessel using the extraction pump 4.2 as described above. Only little product buildup was observed in the conical outlet section of the separating vessel 4. The concentrated fluid H had a hexane concentration of 20 wt % and a viscosity of 7,600,000 mPa's measured at 60° C.

Example 8

The feedstock, fluid F1, and the concentration unit were the same as in example 8. The heating medium of the heater 2 was set to 170° C., the pressure in the separating vessel 4 was 230 hPa. The concentrated fluid H in the bottom of the separating vessel 4 was a free flowing foamy liquid, as observed through a sight glass and could be conveyed from the separating vessel using the extraction pump 4.2 as described above. Some product buildup was observed in the conical outlet section of the separating vessel 4. The concentrated fluid H had a hexane concentration of 15 wt % and a viscosity of 15,600,000 mPa*s measured at 60° C.

The results of examples 4 to 8 showing the performance of the concentration stage are summarized in table 1.

TABLE 1

| Example | T [° C.] at heater 2* | P [hPa] in degassing vessel 4 | Hexane content [wt %] of fluid H* | Viscosity [mPa*s] at 60° C. of fluid H |
|---|---|---|---|---|
| 4 | 125° C. | 1013 | 71% | 4,840 |
| 5 | 155° C. | 1013 | 53% | 65,000 |
| 6 | 170° C. | 1013 | 42% | 317,700 |
| 7 | 170° C. | 500 | 20% | 7,600,000 |
| 8 | 170° C. | 230 | 15% | 15,600,000 |

*temperature set for the heating medium

Examples 9 to 15: Concentration and Extrusion

The Device

The device used for the examples was similar to the one shown in FIG. 5. A piston pump was used to pump the fluid F to heater 2. The heater 2 was a single rube-in-tube type heat exchanger. The internal pipe was equipped with a static mixer of Kenics type, the diameter of the internal pipe was 15 mm. The tube was heated by a tube shaped shell. The heating medium was heating oil (Marlotherm). A pressure relief valve 3 was installed prior to the degassing vessel 4, the pressure upstream of the valve was controlled automatically to a set point value. This set point was chosen so that boiling in the heated fluid G was prevented. The heated fluid G was introduced into the degassing vessel 4 from the top. The conical outlet of the degassing vessel 4 was equipped with a pump 4.2, which was a combination of an extruder type pump and a gear pump.

In step b), the concentrated fluid H obtained in step a) was then passed through a reheating unit 6 which was a single tube-in-tube type heat exchanger. The internal pipe diameter was 20 mm, the internal pipe was equipped with a static mixer of type SMX. Heating was accomplished by a tube shell using a heating oil (Marlotherm) as heating medium.

In step c) the reheated concentrated fluid L was fed into the extruder unit. The extruder of the extruder unit was a co-rotating twin screw extruder with a screw diameter of 32 mm and a screw length of 1260 mm. The extruder unit further comprised a nozzle as a pressure control device 7, (see FIG. 7) upstream the feeding point 12 of the extruder, three extruder degassing sections, whereby the feeding point 12 was located at the first extruder degassing section, whereby the first extruder degassing section comprised a conveying section 16A, a rear vent port 13 connected to a vapor line 13.1 in upstream direction and whereby the extruder unit further comprised two downstream extruder degassing sections each comprising a conveying section 16B and 16 C, a vent port 15A and 15B, whereby the vent ports 15A and 15B were each connected to a vapour line 15.1A and 15.1B and whereby each of the conveying sections 16A, 16B and 16C was terminated by a accumulating section 18A, 18B and 20 and whereby the extruder unit further comprised an outlet section 22.

Each of the sections, in particular the conveying sections could be independently heated through the barrel of the extruder in order to control the temperature of the rubber anywhere in the extruder.

The rear vent port 13 was connected to a condenser via a first vapor line 13.1. The condenser was a plate type heat exchanger and further connected to a liquid ring vacuum pump. The other vapor lines 15.1A and 15.1B were connected to a condensing system comprising a screw type dry running vacuum pump.

The first accumulating section 18A was made of kneading blocks, the second accumulating section 18B was made of kneading blocks and a back conveying element. Both accumulating sections 18A and 18B were designed to allow the injection of a stripping agent.

A sight glass was installed in the vent port 15.1B to allow the observation of the conveying behavior and of the product properties in the conveying section 16C.

The kneading zone 20 and outlet section 22 were combined into one functional section. The accumulating section zone was composed of a die plate and a nozzle forming a strand of rubber which was formed into rubber crumbs at the outlet section.

Example 9

Fluid F2 as described above was used as feedstock (fluid F). The throughput of fluid F2 was set to 20 kg/h, which corresponds to 4.4 kg/h of the final bromobutyl rubber product. The heating temperature of the heater 2 was set to 154° C., the pressure in the separating vessel 4 to 626 hPa. The temperature of the heating medium of the reheating unit 6 was set to 153° C., the pressure in the rear vent port 13 was 626 hPa. The barrel temperature of the extruder was 81° C. The pressure in the second and third vent port 15A and 15B was lowered to 6 hPa. Nitrogen was fed into the accumulating section 18B as a stripping agent at a rate of 0.85 wt % with respect to mass of the final bromobutyl rubber product. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.
Total volatiles: 0.89 wt %
Hexane: 0.65 wt %
Water: 0.24 wt %.

Example 10

Fluid F2 as described above was used as feedstock (fluid F). The throughput of fluid F2 was set to 5 kg/h, which corresponds to 1.1 kg/h of the final bromobutyl rubber product. The heating temperature of the heater 2 was set to 157° C., the pressure in the separating vessel 4 to 633 hPa. The temperature of the heating medium of the reheating unit 6 was set to 156° C., the pressure in the rear vent port 13 was 633 hPa. The barrel temperature of the extruder was 81° C. The pressure in the second and third vent port 15A and 15B was lowered to 6 hPa. Nitrogen was fed into the accumulating section 18B as a stripping agent at a rate of 3.41 wt % with respect to mass of the final bromobutyl rubber product. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.
Total volatiles: 0.72 wt %
Hexane: 0.56 wt %
Water: 0.16 wt %.

Example 11

Fluid F2 as described above was used as feedstock (fluid F). The throughput of fluid F2 was set to 10 kg/h, which corresponds to 2.2 kg/h of the final bromobutyl rubber product. The heating temperature of the heater 2 was set to 156° C., the pressure in the separating vessel 4 to 318 hPa. The temperature of the heating medium of the reheating unit 6 was set to 156° C., the pressure in the rear vent port 13 was 318 hPa. The barrel temperature of the extruder was 81° C. The pressure in the second and third vent port 15A and 15B was lowered to 12 hPa. Nitrogen was fed into the accumulating section 18B as a stripping agent at a rate of 1.70 wt % with respect to mass of the final bromobutyl rubber product. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.
Total volatiles: 0.80 wt %
Hexane: 0.40 wt %
Water: 0.40 wt %.

Example 12

Fluid F2 as described above was used as feedstock (fluid F). The throughput of fluid F2 was set to 10 kg/h, which corresponds to 2.2 kg/h of the final bromobutyl rubber product. The heating temperature of the heater 2 was set to 155° C., the pressure in the separating vessel 4 to 475 hPa. The temperature of the heating medium of the reheating unit 6 was set to 156° C., the pressure in the rear vent port 13 was 475 hPa. The barrel temperature of the extruder was 100° C. The pressure in the second and third vent port 15A and 15B was lowered to 11 hPa. No stripping agent was fed into the accumulating section 18B. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.
Total volatiles: 0.97 wt %
Hexane: 0.58 wt %
Water: 0.39 wt %.

Example 13

Fluid F2 as described above was used as feedstock (fluid F). The throughput of fluid F2 was set to 10 kg/h, which corresponds to 2.2 kg/h of the final bromobutyl rubber product. The heating temperature of the heater 2 was set to 155° C., the pressure in the separating vessel 4 to 475 hPa. The temperature of the heating medium of the reheating unit 6 was set to 156° C., the pressure in the rear vent port 13 was 475 hPa. The barrel temperature of the extruder was 100° C. The pressure in the second and third vent port 15A and 15B was lowered to 11 hPa. Water was fed into the accumulating section 18B as a stripping agent at a rate of 4.09 wt % with respect to mass of the final bromobutyl rubber product. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.
Total volatiles: 0.45 wt %
Hexane: 0.31 wt %
Water: 0.14 wt %.

Example 14

Fluid F2 as described above was used as feedstock (fluid F). The throughput of fluid F2 was set to 10 kg/h, which corresponds to 2.2 kg/h of the final bromobutyl rubber product. The heating temperature of the heater 2 was set to 155° C., the pressure in the separating vessel 4 to 475 hPa. The temperature of the heating medium of the reheating unit 6 was set to 156° C., the pressure in the rear vent port 13 was 475 hPa. The barrel temperature of the extruder was 130° C. The pressure in the second and third vent port 15A and 15B was lowered to 11 hPa. Water was fed into the accumulating section 18B as a stripping agent at a rate of 4.09 wt % with respect to mass of the final bromobutyl rubber product. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.
Total volatiles: 0.22 wt %
Hexane: 0.13 wt %
Water: 0.09 wt %.

Example 15

Fluid F2 as described above was used as feedstock (fluid F). The throughput of fluid F2 was set to 10 kg/h, which corresponds to 2.2 kg/h of the final bromobutyl rubber product. The heating temperature of the heater 2 was set to 155° C., the pressure in the separating vessel 4 to 475 hPa. The temperature of the heating medium of the reheating unit 6 was set to 156° C., the pressure in the rear vent port 13 was 475 hPa. The barrel temperature of the extruder was 160° C. The pressure in the second and third vent port 15A and 15B was lowered to 11 hPa. Water was fed into the accumulating section 18B as a stripping agent at a rate of 4.09 wt % with respect to mass of the final bromobutyl rubber product. Through the sight glass in the separating vessel 4 it was observed, that the concentrated fluid H was still a free flowing fluid. Through the sight glass at the last vent port of the extruder 15B it could be observed that the rubber had already changed to a crumbly state in the extruder. The crumbs appeared white and were permanently drawn in and kneaded by the action of the screw shafts. At the outlet section 22 a strand of rubber was produced, which was then cut into crumbs or chunks of rubber. The final bromobutyl rubber product P collected at the outlet section was analyzed to determine the hexane and total volatiles concentration.

Total volatiles: 0.09 wt %
Hexane: 0.04 wt %
Water: 0.05 wt %.

The results of examples 9 to 15 are summarized in tables 2*a*), b) and c).

TABLE 2a

Concentration Unit
Process conditions in the Concentration and Reheating Units

| Example | Throughput [kg/h] of fluid F2 | Throughput* [kg/h] of Product P | T [° C.] at heater 2* | P [hPa] in degassing vessel 4 | T [° C.] at reheating unit 6* |
|---|---|---|---|---|---|
| 9  | 20 | 4.4 | 154 | 626 | 153 |
| 10 | 5  | 1.1 | 157 | 633 | 156 |
| 11 | 10 | 1.1 | 156 | 318 | 156 |
| 12 | 10 | 1.1 | 155 | 475 | 155 |
| 13 | 10 | 1.1 | 155 | 475 | 155 |
| 14 | 10 | 1.1 | 155 | 475 | 155 |
| 15 | 10 | 1.1 | 155 | 475 | 155 |

*temperature set for the heating medium

TABLE 2b

Extruder Unit
Process conditions in the Extruder Unit

| Example | P [hPa] at vent port 13 | P [hPa] at vent port 15A | P [hPa] at vent port 15B | Stripping agent at section 18B | Amount [wt %]* |
|---|---|---|---|---|---|
| 9  | 626 | 6  | 6  | nitrogen | 0.85 |
| 10 | 633 | 6  | 6  | nitrogen | 3.41 |
| 11 | 318 | 12 | 12 | nitrogen | 1.70 |
| 12 | 475 | 11 | 11 | none | — |
| 13 | 475 | 11 | 11 | water | 4.09 |
| 14 | 475 | 11 | 11 | water | 4.09 |
| 15 | 475 | 11 | 11 | water | 4.09 |

*wt % with respect to bromobutyl rubber product

TABLE 2c

Results
Contents of volatiles in the final product

| Example | Hexane [wt %] | Water [wt %]* | Total Volatiles [wt %] |
|---|---|---|---|
| 9  | 0.65 | 0.24 | 0.89 |
| 10 | 0.56 | 0.16 | 0.72 |
| 11 | 0.40 | 0.40 | 0.80 |
| 12 | 0.58 | 0.39 | 0.97 |
| 13 | 0.31 | 0.14 | 0.45 |
| 14 | 0.13 | 0.09 | 0.22 |
| 15 | 0.04 | 0.05 | 0.09 |

*Difference of Total Volatiles and Hexane content

Examples 16 to 19: Concentration and Extrusion

The Device

The device used for the examples was similar to the one shown in FIG. 6 and identical to the one described for examples 13 to 19, except that:

The extruder unit comprised a fourth degassing zone, comprising a fourth conveying section 16D and a fourth vent port 15C equipped with a vapor line 15.1C which was connected to a previous vapor line 15.1B.

The sight glass to observe the product behavior was part of the vent port 15C instead of the vent port 15B.

The third accumulating section 18C was made of kneading elements and a back conveying element similar to the second accumulating section 18B and was also designed to allow the injection of a stripping agent The final kneading zone 20 comprised kneading and back conveying elements The outlet section 22 just comprised screw conveying elements and an open outlet.

General Procedure

Fluid F2 as described above was used as feedstock (fluid F). The throughput of fluid F2 was set to 10 kg/h, which corresponds to 2.2 kg/h of the final bromobutyl rubber product. The heating temperature of the heater 2 was set to 160° C., the pressure in the separating vessel 4 to 450 hPa. The temperature of the heating medium of the reheating unit 6 was set to 160° C., the pressure in the rear vent port 13 was 450 hPa. The barrel temperature of the extruder was 130° C. The pressure in the second, third and fourth vent port 15A, 15B and 15C was lowered to 6 hPa.

The types and amounts of stripping agents injected at the accumulating sections 18B and 18C were varied as can be seen in table 3*b*). Through the sight glass in the separating vessel 4 it was observed for each experiment, that the concentrated fluid H was still a free flowing fluid. Through the sight glass at the last vent port of the extruder 15C it could be observed that the rubber had already changed to a crumbly state in the extruder. The crumbs appeared white and were permanently drawn in and kneaded by the action of the screw shafts. At the outlet section 22 rubber crumbs of a size of roughly 2-6 mm were formed. The final bromobutyl rubber product P collected at the outlet section was analyzed to determine the hexane and total volatiles concentration.

The process conditions and results are given in tables 3*a*), b) and c).

TABLE 3a

Concentration Unit
Process conditions in the Concentration and Reheating Units

| Example | Throughput [kg/h] of fluid F2 | Throughput* [kg/h] of Product P | T [° C.] at heater 2* | P [hPa] in degassing vessel 4 | T [° C.] at reheating unit 6* |
|---|---|---|---|---|---|
| 16 to 19 | 10 | 1.1 | 160 | 450 | 160 |

*temperature set for the heating medium

TABLE 3b)

| | | Extruder Unit Process conditions in the Extruder Unit* | | | | |
|---|---|---|---|---|---|---|
| Example | P [hPa] at vent port 13 | P [hPa] at vent ports 15A, 15B and 15C | Stripping agent at section 18B | Amount [wt %]** | Stripping agent at section 18B | Amount [wt %]** |
| 19 | 450 | 6 | none | — | none | — |
| 20 | 450 | 6 | nitrogen | 1.70 | none | — |
| 21 | 450 | 6 | none | — | water | 2.73 |
| 22 | 450 | 6 | nitrogen | 1.70 | water | 2.73 |

*The barrel temperature of the extruder was set to 130° C. in all examples
**wt % with respect to bromobutyl rubber product TABLE 3c

| | Results Contents of volatiles in the final product | | |
|---|---|---|---|
| Example | Hexane [wt %] | Water [wt %] | Total Volatiles [wt %] |
| 19 | 0.03 | 0.08 | 0.11 |
| 20 | 0.02 | 0.08 | 0.10 |
| 21 | 0.03 | 0.12 | 0.15 |
| 22 | 0.02 | 0.07 | 0.09 |

Examples 20 to 23: Concentration and Extrusion

The Device

The device used for the examples was identical to the one described for examples 16 to 19

Example 20

Fluid F1 as described above was used as feedstock (fluid F). The throughput of fluid F1 was set to 20 kg/h, which corresponds to 4.4 kg/h of the final bromobutyl rubber product. The heating temperature of the heater 2 was set to 139° C., the pressure in the separating vessel 4 to 756 hPa. The temperature of the heating medium of the reheating unit 6 was set to 153° C., the pressure in the rear vent port 13 was 147 hPa. The barrel temperature of the extruder was 130'C. The pressure in the second vent port 15A was lowered to 270 hPa, the pressure in the third and fourth vent port 15b and 15C was lowered to 40 hPa. Water was fed into each of the accumulating sections 18B and 18C as a stripping agent at a rate of 1.36 wt % with respect to the mass of the final bromobutyl rubber product. Through the sight glass in the separating vessel 4 it was observed, that the concentrated fluid H was still a free flowing fluid. Through the sight glass at the last vent port of the extruder 15C it could be observed that the rubber had already changed to a crumbly state in the extruder. The crumbs appeared white and were permanently drawn in and kneaded by the action of the screw shafts. At the outlet section 22 rubber crumbs of a size of roughly 2-6 mm were formed. The final bromobutyl rubber product P collected at the outlet section was analyzed to determine the hexane and total volatiles concentration.
Total volatiles: 0.200 wt %
Hexane: 0.080 wt %
Water: 0.120 wt %.

Example 21

Fluid F1 as described above was used as feedstock (fluid F). The throughput of fluid F1 was set to 20 kg/h, which corresponds to 4.4 kg/h of the final bromobutyl rubber product. The heating temperature of the heater 2 was set to 157° C., the pressure in the separating vessel 4 to 869 hPa. The temperature of the heating medium of the reheating unit 6 was set to 147° C., the pressure in the rear vent port 13 was 869 hPa. The barrel temperature of the extruder was 130° C. The pressure in the second vent port 15A was lowered to 270 hPa, the pressure in the third and fourth vent port 15b and 15C was lowered to 40 hPa. Water was fed into each of the accumulating sections 18B and 18C as a stripping agent at a rate of 2.73 wt % with respect to the mass of the final bromobutyl rubber product. Through the sight glass in the separating vessel 4 it was observed, that the concentrated fluid H was still a free flowing fluid.

Through the sight glass at the last vent port of the extruder 15C it could be observed that the rubber had already changed to a crumbly state in the extruder. The crumbs appeared white and were permanently drawn in and kneaded by the action of the screw shafts. At the outlet section 22 rubber crumbs of a size of roughly 2-6 mm were formed. The final bromobutyl rubber product P collected at the outlet section was analyzed to determine the hexane and total volatiles concentration.

Total volatiles: 0.260 wt %

Hexane: 0.092 wt %

Water: 0.168 wt %.

Example 22

Fluid F1 as described above was used as feedstock (fluid F). The throughput of fluid F1 was set to 20 kg/h, which corresponds to 4.4 kg/h of the final bromobutyl rubber product. The heating temperature of the heater 2 was set to 157° C., the pressure in the separating vessel 4 to 796 hPa. The temperature of the heating medium of the reheating unit 6 was set to 147° C., the pressure in the rear vent port 13 was 796 hPa. The barrel temperature of the extruder was 130° C. The pressure in the second vent port 15A was lowered to 140 hPa, the pressure in the third and fourth vent port 15b and 15C was lowered to 40 hPa. Water was fed into each of the accumulating sections 18B and 18C as a stripping agent at a rate of 1.29 wt % with respect to the mass of the final bromobutyl rubber product. Through the sight glass in the separating vessel 4 it was observed, that the concentrated fluid H was still a free flowing fluid. Through the sight glass at the last vent port of the extruder 15C it could be observed that the rubber had already changed to a crumbly state in the extruder. The crumbs appeared white and were permanently drawn in and kneaded by the action of the screw shafts. At the outlet section 22 rubber crumbs of a size of roughly 2-6 mm were formed. The final bromobutyl rubber product P collected at the outlet section was analyzed to determine the hexane and total volatiles concentration.

Total volatiles: 0.180 wt %
Hexane: 0.099 wt %
Water: 0.081 wt %.

TABLE 4a

Concentration Units
Process conditions in the Concentration Units

| Example | Throughput* [kg/h] | T [° C.] at heater 2A** | P [hPa] in degassing vessel 4A | T [° C.] at heater 2B** | P [hPa] in degassing vessel 4B |
|---|---|---|---|---|---|
| 20 | 4.4 | 139 | 756 | 123 | 130 |
| 21 | 4.4 | 157 | 869 | 147 | 130 |
| 22 | 4.6 | 157 | 796 | 147 | 130 |
| 23 | 4.2 | 157 | 791 | 147 | 129 |

*calculated on bromobutyl rubber product leaving the extruder unit
**temperature set for the heating medium

TABLE 4b)

Extruder Unit
Process conditions in the Extruder Unit*

| Example | P [hPa] at vent port 13 | P [hPa] at vent port 15A | P [hPa] at vent port 15B | Stripping agent at section 18B | Amount [wt %]** | Stripping agent at section 18C | Amount of [wt %]** |
|---|---|---|---|---|---|---|---|
| 20 | 756 | 270 | 40 | water |  | water |  |
| 21 | 869 | 270 | 40 | water | 2.73 | water | 2.73 |
| 22 | 796 | 140 | 40 | water | 1.29 | water | 1.29 |
| 23 | 791 | 140 | 40 | nitrogen | 0.89 | water | 1.42 |

*The barrel temperature of the extruder was set to 130° C. in all examples
**wt % with respect to rubber mass flow

Example 23

Fluid F1 as described above was used as feedstock (fluid F). The throughput of fluid F1 was set to 20 kg/h, which corresponds to 4.4 kg/h of the final bromobutyl rubber product. The heating temperature of the heater 2 was set to 157° C., the pressure in the separating vessel 4 to 791 hPa. The temperature of the heating medium of the reheating unit 6 was set to 147° C., the pressure in the rear vent port 13 was 791 hPa. The barrel temperature of the extruder was 130° C. The pressure in the second vent port 15A was lowered to 140 hPa, the pressure in the third and fourth vent port 15b and 15C was lowered to 40 hPa. Nitrogen was fed into the first accumulating section 18B at a rate of 0.89 wt % with respect to the mass of the final bromobutyl rubber product and water into the second accumulating section 18C at a rate of 1.29 wt %. Through the sight glass in the separating vessel 4 it was observed, that the concentrated fluid H was still a free flowing fluid. Through the sight glass at the last vent port of the extruder 15C it could be observed that the rubber had already changed to a crumbly state in the extruder. The crumbs appeared white and were permanently drawn in and kneaded by the action of the screw shafts. At the outlet section 22 rubber crumbs of a size of roughly 2-6 mm were formed. The final bromobutyl rubber product P collected at the outlet section was analyzed to determine the hexane and total volatiles concentration.

Total volatiles: 0.140 wt %
Hexane: 0.055 wt %
Water: 0.085 wt %.

The process conditions and results are summarized in tables 4a), b) and c).

TABLE 4c

Results
Contents of volatiles in the final product

| Example | Hexane [wt %] | Water [wt %]* | Total Volatiles [wt %] |
|---|---|---|---|
| 20 | 0.08 | 0.12 | 0.20 |
| 21 | 0.09 | 0.17 | 0.26 |
| 22 | 0.10 | 0.08 | 0.18 |
| 23 | 0.06 | 0.08 | 0.14 |

The reference numerals used hereinbefore are summarized below:
1 pump
2, 2A, 2B heater
3 pressure control device
4, 4A, 4B degassing vessel
4.1, 4.1A, 4.1B vapor line
4.2, 4.2A, 4.2B pump
6 reheating unit
7 pressure control device
12 feeding point
13 rear vent port (upstream)
13.1 vapor line
15, 15A, 15B, 15B, 15C vent port (downstream)
15.1, 15.1A, 15.1B, 15.1C vapor line
16, 16A, 16B, 16B, 16C conveying section (downstream)
18, 18A, 18B, 18B, 18C accumulating section
last accumulating section
22 outlet section
heater
26, 26A, 26B separating vessel
27, 27A, 27B aqueous phase
28, 28A, 28B organic phase
30, 30A, 30B mixing section 32, 32A, 32B mixer
34, 34A, 34B separating wall
36, 36A, 36B recirculation pump
38, 38A, 38B recirculation line
39, 39A, 39B coalescer
40 recirculation pump
42 recirculation line
44 heater
100 heat exchanger
200 feed cooler
300 catalyst preparation unit
400 polymerization reactor
500 mixer
600 column
700 halogenation reactor
800 finishing equipment
900 monomer recovery unit
1000 monomer purification section
1100 solvent recovery
1200 solvent purification section
A crude fluid A
C waste water
D aqueous phase for recycling
E fresh water
F fluid F
FM feed of monomers
FM monomer recycling stream $FM_R$
G heated fluid H
H concentrated fluid H
HAL halogenating agent
HIIR halogenated butyl rubber
IIR butyl rubber
J pre-concentrated fluid J
K reheated pre-concentrated fluid K
L reheated concentrated fluid L
OX oxidizing agent
P product
Q stopping agent
S common aliphatic medium
$S_R$ common aliphatic medium recycling stream

What is claimed is:

1. A process for removing volatile compounds from a fluid (F) containing 3 wt % to 50 wt % of at least one halogenated butyl rubber and 60 wt % to 97 wt % of volatile compounds comprising water and at least one volatile organic compound, whereby the halogenated butyl rubber and volatile compounds add up to 90 wt % to 100 wt % of the total mass of fluid (F), the process comprising:
  a) treating the fluid (F) in at least one concentrator unit comprising at least a heater, a degassing vessel comprising a flash evaporator in the shape of a cyclone, and a vapor line, the treating comprising heating the fluid (F) with the heater to provide a heated fluid (G), feeding the heated fluid (G) at a pressure of 2 to 60 bar into the degassing vessel, flashing at least a portion of the volatile compounds, and removing the flashed portion of the volatile compounds via the vapor line to produce a concentrated fluid (H) that is free-flowing and comprises 10 to 60 wt % of the rubber and 40 to 90 wt % of the volatile compounds,
  b) reheating the concentrated fluid (H) in at least one reheating unit to obtain a reheated concentrated fluid (L) that is a free-flowing fluid; and
  c) feeding the reheated concentrated fluid (L) into at least one extruder unit comprising at least an extruder degassing section comprising at least a conveying section, a vent port with one or more vapor lines, an accumulating section and an outlet section, to remove a portion of the volatile compounds through the vent ports and vapor lines to produce a product (P) at the outlet section that is substantially free of volatile compounds.

2. The process pursuant to claim 1, wherein:
the pressure in the degassing vessel is 100 hPa to 4,000 hPa; and
the free-flowing concentrated fluid (H) comprises 10 to 60 wt % of the rubber, 25 to 90 wt % of volatile organic solvent, and 0.5 to 15 wt % water.

3. The process pursuant to claim 1, wherein the halogenated butyl rubber is bromobutyl rubber.

4. The process pursuant to claim 2, wherein:
the heated fluid (G) is fed to the degassing vessel at a preswure of 4 to 30 bar;
the pressure in the degassing vessel is 200 hPa to 2,000 hPa; and
the free-flowing concentrated fluid (H) contains 25 to 60 wt % of the halogenated butyl rubber, 25 to 75 wt % of the volatile organic solvent, and 0.5 to 15 wt % water, whereby the halogenated butyl rubber, the volatile organic compound, and the water add up to 95 wt % to 100 wt % of the total mass of fluid (H).

5. The process pursuant to claim 1, wherein:
the heated fluid (G) is fed into the top of the degassing vessel,
the degassing vessel has at least a torispherical shaped bottom outlet portion to facilitate removal of the concentrated fluid (H) from the degassing vessel, and
fluid (H) is pumped from the degassing vessel via a pump at the torishperical bottom portion, wherein the pump has an inlet with a cross sectional area $A_{inlet}$ and the degassing vessel comprises an inner surface with an area $A_{degas}$, wherein the ratio $A_{inlet}/A_{degas}$ is $0.001 \leq A_{inlet}/A_{degas} \leq 0.4$ to reduce pressure drop at the inlet.

6. The process pursuant to claim 1, wherein the extruder unit comprises a single screw extruder or a multiscrew extruder.

7. The process pursuant to claim 1, wherein the extruder unit comprises a control device configured to operate separate zones of the extruder independently of each other at different temperatures so that the zones can either be heated, unheated or cooled independently of one another.

8. The process pursuant to claim 1, wherein the vent ports comprise stuffer screws to prevent the reheated concentrated fluid (L) or the product (P) from coming out of the vent ports.

9. The process pursuant to claim 1, further comprising adding a stripping agent in the extruder unit.

10. The process pursuant to claim 1, wherein the extruder unit comprises a feed point for receiving the fluid (L) and at least one additional extruder degassing section in an upstream direction of the feed point.

11. The process pursuant to claim 1, further comprising obtaining the fluid (F) from a process of removing hydrophilic compounds and optionally water from a crude fluid (A) containing at least one non-volatile polymer, at least one volatile organic compound, one or more hydrophilic compounds, and optionally water, wherein the process of removing hydrophilic compounds and optionally water from a crude fluid (A) comprises
  treating the crude fluid (A) in at least one pre-washing unit comprising at least a separating apparatus, the treating comprising mixing the fluid (A) with water to obtain an organic phase and an aqueous phase wherein the organic phase comprises primarily the non-volatile polymer and the volatile organic compounds and the aqueous phase comprises primarily water and hydrophilic compounds, separating the organic phase from the aqueous phase in a separating apparatus, and removing the organic phase as fluid (F).

12. The process pursuant to claim 11, further comprising obtaining the fluid (A) from a process comprising:

I) providing a reaction medium comprising
   a common aliphatic medium comprising at least 50 wt. % of one or more aliphatic hydrocarbons having a boiling point of 45° C. to 80° C. at a pressure of 1013 hPa, and
   a monomer mixture comprising at least one isoolefin monomer, at least one multiolefin monomer and either no or at least one other co-polymerizable monomer
   in a mass ratio of monomer mixture to common aliphatic medium of 40:60 to 99:1;

II) polymerizing the monomer mixture within the reaction medium to form a rubber solution comprising a rubber polymer at least substantially dissolved in a mixture medium comprising the common aliphatic medium and residual monomers of the monomer mixture;

III) separating residual monomers of the monomer mixture from the rubber solution to form a separated rubber solution comprising the rubber polymer and the common aliphatic medium, and IV) halogenating the rubber polymer in the separated rubber solution using halogenating agent to produce the fluid (A).

13. The process pursuant to claim 12, wherein the halogenating agent is a brominating agent.

14. The process pursuant to claim 13, further comprising at least partially regenerating the brominating agent by an oxidizing agent.

15. A process for producing a halogenated butyl rubber substantially free of volatile compounds, the process comprising:

providing a reaction medium comprising
   a common aliphatic medium comprising at least 50 wt. % of one or more aliphatic hydrocarbons having a boiling point of 45° C. to 80° C. at a pressure of 1013 hPa, and
   a monomer mixture comprising at least one isoolefin monomer, at least one multiolefin monomer and either no or at least one other co-polymerizable monomer
   in a mass ratio of monomer mixture to common aliphatic medium of 40:60 to 99:1;

polymerizing the monomer mixture within the reaction medium to form a rubber solution comprising a rubber polymer at least substantially dissolved in a mixture medium comprising the common aliphatic medium and residual monomers of the monomer mixture;

separating residual monomers of the monomer mixture from the rubber solution to form a separated rubber solution comprising the rubber polymer and the common aliphatic medium;

halogenating the rubber polymer in the separated rubber solution using a halogenating agent to produce a fluid (F) containing 3 wt % to 50 wt % of at least one halogenated butyl rubber and 60 wt % to 97 wt % of volatile compounds comprising water and at least one volatile organic compound, whereby the halogenated butyl rubber and volatile compounds add up to 90 wt % to 100 wt % of the total mass of fluid (F);

treating the fluid (F) in at least one concentrator unit comprising at least a heater, a degassing vessel comprising a flash evaporator in the shape of a cyclone, and a vapor line, the treating comprising heating the fluid (F) with the heater to provide a heated fluid (G), feeding the heated fluid (G) into the degassing vessel, flashing at least a portion of the volatile compounds, and removing the flashed portion of the volatile compounds via the vapor line to produce a concentrated fluid (H) that is free-flowing and comprises 10 to 60 wt % of the rubber and 40 to 90 wt % of the volatile compounds;

reheating the concentrated fluid (H) in at least one reheating unit to obtain a reheated concentrated fluid (L) that is a free-flowing fluid; and feeding the reheated concentrated fluid (L) into at least one extruder unit comprising at least an extruder degassing section comprising at least a conveying section, a vent port with one or more vapor lines, an accumulating section and an outlet section, to remove a portion of the volatile compounds through the vent ports and vapor lines to produce a product (P) at the outlet section that is substantially free of volatile compounds.

16. The process pursuant to claim 15, wherein the halogenating agent is a brominating agent.

17. The process pursuant to claim 16, further comprising at least partially regenerating the brominating agent by an oxidizing agent.

18. The process pursuant to claim 4, wherein the product (P) is a halobutyl rubber having a total concentration of volatile compounds of less than 0.5 wt % based on the mass of the halobutyl rubber.

19. The process pursuant to claim 18, wherein the product (P) is a halobutyl rubber having a residual water concentration of less than 0.25 wt %, and a residual organic solvent content of less than 0.25 wt %, based on the mass of the halobutyl rubber.

20. The process pursuant to claim 18, wherein:
the degassing vessel has a shape of a cyclone and comprises an inlet at the top with a torispherical shaped bottom outlet portion disposed vertically below the inlet and comprising a fluid pump for feeding the fluid (H) from the degassing vessel to at least the reheating unit, wherein the process comprises feeding the heated fluid (G) into the degassing vessel via the top inlet, and pumping the fluid (H), via the fluid pump, from the bottom portion to the at least the reheating unit; and the product (P) is a halobutyl rubber having a residual water concentration of less than 0.075 wt % and a residual organic solvent concentration of less than 0.1 wt %, based on the mass of the halobutyl rubber.

* * * * *